US011316342B2

(12) United States Patent
Uto

(10) Patent No.: US 11,316,342 B2
(45) Date of Patent: Apr. 26, 2022

(54) DIRECT CURRENT POWER SUPPLYING SYSTEM

(71) Applicant: TDK CORPORATION, Tokyo (JP)

(72) Inventor: Hisakazu Uto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/964,357

(22) PCT Filed: Feb. 6, 2018

(86) PCT No.: PCT/JP2018/003920
§ 371 (c)(1),
(2) Date: Jul. 23, 2020

(87) PCT Pub. No.: WO2019/155507
PCT Pub. Date: Aug. 15, 2019

(65) Prior Publication Data
US 2021/0036514 A1    Feb. 4, 2021

(51) Int. Cl.
*H02J 1/04*    (2006.01)
*H02J 7/00*    (2006.01)
(Continued)

(52) U.S. Cl.
CPC .............. *H02J 1/04* (2013.01); *H02J 7/007* (2013.01); *H02J 7/0063* (2013.01); *H02J 7/34* (2013.01);
(Continued)

(58) Field of Classification Search
CPC .. H02J 1/04; H02J 7/0063; H02J 7/007; H02J 7/34; H02J 1/106; H02J 1/084; H02J 1/10;
(Continued)

(56) References Cited

U.S. PATENT DOCUMENTS

| 2011/0133556 A1* | 6/2011 | Choi | ........................ H02J 3/381 307/65 |
| 2017/0126043 A1 | 5/2017 | Yoshida et al. | |
| 2017/0288416 A1 | 10/2017 | Yamaguchi et al. | |

FOREIGN PATENT DOCUMENTS

| CN | 106786729 A | 5/2017 |
| EP | 2985857 | 2/2016 |

(Continued)

OTHER PUBLICATIONS

Official Communication issued in International Bureau of WIPO Patent Application No. PCT/JP2018/003920, dated Mar. 6, 2018.
India Official Action, dated Dec. 29, 2020, in India Patent Application No. 202047033159.

*Primary Examiner* — Lincoln D Donovan
*Assistant Examiner* — Alex W Lam
(74) *Attorney, Agent, or Firm* — Greenblum & Bernstein, P.L.C.

(57) ABSTRACT

A standalone direct current (DC) power supplying system, which is not connected to commercial power, includes a power conditioner that supplies generated power W2 of a power generator to a DC bus, DC/DC converters that convert a bus voltage Vbs and supply load power (WLa+WLb) to load appliances, bidirectional DC/DC converters that supply a constant DC current from the DC bus to storage batteries or from the storage batteries to the DC bus, and an energy management system. When the generated power W2 exceeds the load power (WLa+WLb), the energy management system causes the converters to supply a constant DC current with a common charging rate to the storage batteries, and when the generated power W2 falls below the load power (WLa+WLb), the energy management system causes the converters to supply a constant DC current with a common discharging rate from the storage batteries to the DC bus.

6 Claims, 2 Drawing Sheets

(51) Int. Cl.
*H02J 7/34* (2006.01)
*H02M 3/04* (2006.01)
*H02M 3/335* (2006.01)

(52) U.S. Cl.
CPC ......... *H02M 3/04* (2013.01); *H02M 3/33584* (2013.01)

(58) Field of Classification Search
CPC ...... H02J 1/102; H02J 1/14; H02J 3/10; H02J 3/28; H02J 3/32; H02J 7/0003; H02J 7/0032; H02J 7/0025; H02J 7/00714; H02J 7/02; H02J 7/022; H02J 2207/00; H02J 2207/30; H02M 3/04; H02M 3/33584; H01M 10/48; H01M 10/44; H01M 10/613; H01M 10/633
See application file for complete search history.

(56) References Cited

FOREIGN PATENT DOCUMENTS

| | | |
|---|---|---|
| EP | 2 587 623 B1 | 6/2016 |
| JP | 2009-131143 | 6/2009 |
| JP | 2012-205488 | 10/2012 |
| JP | 2014-045625 | 3/2014 |
| JP | 2014-207790 | 10/2014 |
| JP | 2017-189005 | 10/2017 |
| WO | 2011/162025 A1 | 12/2011 |
| WO | 2012/057032 | 5/2012 |
| WO | 2015/147171 | 10/2015 |

* cited by examiner

DIRECT CURRENT POWER SUPPLYING SYSTEM

TECHNICAL FIELD

The present invention relates to a standalone direct current (DC) power supplying system that is not connected to commercial power.

BACKGROUND ART

As one example of a DC power supplying system of this type, the DC power supplying system disclosed in Patent Literature 1 cited below is known. This DC power supplying system includes a distributed power supply (for example, a device such as a solar power generator, a wind power generator, or a fuel cell), a DC bus that connects the distributed power supply to a load, a plurality of DC power supplies (chargeable/dischargeable power supplies which include storage batteries), converters (for example, bidirectional DC/DC converters) for connecting the plurality of DC power supplies to the DC bus, and a controller for controlling the plurality of converters. In this DC power supplying system, home appliances, such as air conditioners, televisions and lighting equipment, and information devices, such as personal computers, are connected to the DC bus as loads and operate by receiving DC power (a DC voltage) from the DC bus. In this DC power supplying system, when the voltage supplied to the DC bus by the distributed power supply differs to a predetermined value, the controller performs control so that power is supplied from a DC power supply to the DC bus by at least one converter and DC power is supplied by another at least one converter from the DC bus to another DC power supply so as to keep the voltage of the DC bus at the predetermined value.

According to this DC power supplying system, even when there are large fluctuations in the DC voltage outputted from the distributed power supply to the DC bus, it is possible to stabilize the voltage (the DC voltage) of the DC bus, which makes it possible to supply a stable output voltage (the DC voltage) to a load connected to the DC bus.

CITATION LIST

Patent Literature

Patent Literature 1 PCT International Publication No. 2012/057032 (see pages 3-4 and FIG. 1)

SUMMARY OF INVENTION

Technical Problem

However, with known DC power supplying systems including the conventional DC power supplying system described above, since every converter (the bidirectional DC/DC converter) connected between the storage batteries as a plurality of DC power supplies and the DC bus is a CV type (a Constant-Voltage charging type), even when storage batteries of the same specification are used and converters of the same specification are used, there will be manufacturing errors for the storage batteries and the converters, and due to this and the difficulty in making the wiring that connects the storage batteries and the converters and the wiring that connects the converters and the DC bus exactly the same length (in other words, due to fluctuations in the resistance of the wiring), the current value of the charging/discharging current of each storage battery will not be the same. This means that when charging and discharging of the respective storage batteries is repeated, differences will occur in the remaining battery level of the respective storage batteries. Due to this, differences will also occur in the number of charging and discharging cycles for each storage battery. This results in the problem to be solved of fluctuations in the battery life of the respective storage batteries.

For this reason, the present applicant has developed, for a configuration that uses storage batteries of the same specification (that is, batteries with the same rated charging capacity (nominal capacity)), a DC power supplying system that reduces the difference in the remaining battery level that occurs between storage batteries and thereby reduces the difference in the number of charging and discharging cycles between the storage batteries through the use of CC-type (constant current charging-type) bidirectional DC/DC converters to charge the storage batteries with a common current value during charging and discharge the storage batteries with a common current value during discharging.

However, when configuring this DC power supplying system, even when the required number of storage batteries with the same rated charging capacity are provided, it is rare for the actual fully charged capacities (assumed here to be the amount of charge when the storage batteries are actually fully charged) to completely match for all of the storage batteries. There are also cases where the required number of storage batteries with the same rated charging capacity are not available, in which case the actual fully charged capacities of some of the storage batteries will inevitably differ to the actual fully charged capacities of the other storage batteries. For this reason, when the DC power supplying system described above operates in a state where the actual fully charged capacities of all the storage batteries are not uniform, even if charging and discharging of the storage batteries corresponding to the CC-type bidirectional DC/DC converters are performed with common current values, it will not be possible to sufficiently reduce the difference in the remaining battery levels between the storage batteries. This results in a problem to be solved that it is difficult to further reduce the difference in the number of charging and discharging cycles between the storage batteries.

The present invention was conceived in view of the problem described above and has an object of providing a DC power supplying system capable of greatly reducing fluctuations in battery life when a plurality of storage batteries connected to a DC bus do not have the same fully charged capacity.

Solution to Problem

To achieve the stated object, a standalone direct current (DC) power supplying system that is not connected to commercial power according to the present invention comprises: a DC bus that serves as a bus line of a DC power supply; a power generator; a first converter that supplies generated power generated by the power generator to the DC bus; a second converter that performs voltage conversion on a DC voltage supplied to the DC bus and supplies to a load appliance; a plurality of first storage batteries whose fully charged capacities differ; a plurality of constant current-type first bidirectional converters that are each connected between one of the plurality of first storage batteries and the DC bus, each bidirectionally perform voltage conversion between the DC voltage supplied to the DC bus and a DC voltage for the corresponding first storage battery, and each supply a constant DC current from the DC bus to the first storage battery and from the first storage battery to the DC bus; and a controller, wherein the controller compares the generated power of the power generator with a load power supplied to the load appliance from the second converter, the controller is operable, when the generated power exceeds the load power, to cause the first bidirectional converters to charge the first storage batteries by each supplying the constant DC current to the corresponding first storage battery with a common charging rate, which is based on a power difference between the generated power and the load power and the DC voltage of the DC bus, and the controller is operable, when the generated power is below the load power, to cause the first bidirectional converters to discharge the first storage batteries by each supplying the constant DC current from the corresponding first storage battery to the DC bus with a common discharging rate, which is based on the power difference and the DC voltage of the DC bus.

Since the present invention is configured to perform charging and discharging of the plurality of first storage batteries that supply power to the DC bus with a common charging rate and a common discharging rate, it is possible to charge and discharge the first storage batteries so that the respective SOCs are the same (that is, so that the charging voltage is the same). This means that even when charging and discharging are repeated for the first storage batteries, it is possible to avoid a situation where a difference is produced in the number of charging and discharging cycles due to a difference in charging rates and discharging rates (that is, due to a difference produced thereby in charging voltages), and as a result, it is possible to greatly reduce the occurrence of fluctuations in battery life between the first storage batteries.

The controller should preferably execute a capacity calculation process that calculates present fully charged capacities of the plurality of first storage batteries, be operable, when the first storage batteries are charged, to calculate the constant DC currents that the first bidirectional converters are to supply to the corresponding first storage batteries based on the calculated present fully charged capacities and the common charging rate, and be operable, when the first storage batteries are discharged, to calculate the constant DC currents that the first bidirectional converters are to supply from the corresponding first storage batteries to the DC bus based on the calculated present fully charged capacities and the common discharging rate. Here, even when the present fully charged capacities of the first storage batteries change, it is possible to designate, to the first bidirectional converters, constant DC currents that produce the common charging rate for the first storage batteries and to designate, to the first bidirectional converters, constant DC currents that produce the common discharging rate for the first storage batteries. In this way, even when the fully charged capacities of the first storage batteries change, it is still possible to perform charging and discharging so that the SOCs of the first storage batteries are always uniform, which makes it possible to significantly reduce the occurrence of fluctuations in the battery life of the first storage batteries.

The controller should preferably execute a cycle measurement process that measures a present number of cycles for the plurality of first storage batteries and calculate, in the capacity calculation process, the present fully charged capacity based on the measured present number of cycles. Here, since the present fully charged capacities can be accurately calculated, the constant DC currents (the constant DC currents that produce a common charging rate and constant DC currents that produce a common discharging rate) designated to the first bidirectional converters can be calculated more accurately. Accordingly, it is possible to charge and discharge the first storage batteries in a state where the respective SOCs are more accurately kept the same, and as a result, it is possible to further reduce the occurrence of fluctuations in the battery life of the first storage batteries.

The DC power supplying system should preferably comprise: a second storage battery; and a constant voltage-type second bidirectional converter that is connected between the second storage battery and the DC bus, bidirectionally performs voltage conversion between the DC voltage supplied to the DC bus and a DC voltage of the second storage battery, is operable, when the DC voltage supplied to the DC bus falls below a voltage set in advance, to supply from the second storage battery to the DC bus, and is operable, when the DC voltage supplied to the DC bus is above a voltage set in advance, to supply from the DC bus to the second storage battery. Here, even when there is a sudden fluctuation in the DC voltage of a DC bus (that is, a voltage fluctuation that cannot be completely reduced by control over the first bidirectional converters of a constant current-type), in a state where charging of the second storage battery or discharging from the second storage battery is possible, it is possible to reduce the sudden fluctuation in the DC voltage of the DC bus by having the second bidirectional converter execute charging of the second storage battery or discharging from the second storage battery in a constant voltage manner.

The DC power supplying system should preferably comprise a capacitor that is connected to the DC bus and is charged by the DC voltage of the DC bus. Here, even when there is a sudden fluctuation in the DC voltage of a DC bus (that is, a voltage fluctuation that cannot be completely reduced by control over the first bidirectional converters of a constant current-type), it is possible for the capacitor connected to the DC bus to reduce the sudden fluctuation.

Advantageous Effects of Invention

According to the present invention, it is possible to greatly reduce fluctuations in battery life of a plurality of first storage batteries that supply power to a DC bus.

DESCRIPTION OF EMBODIMENTS

Figure 1:
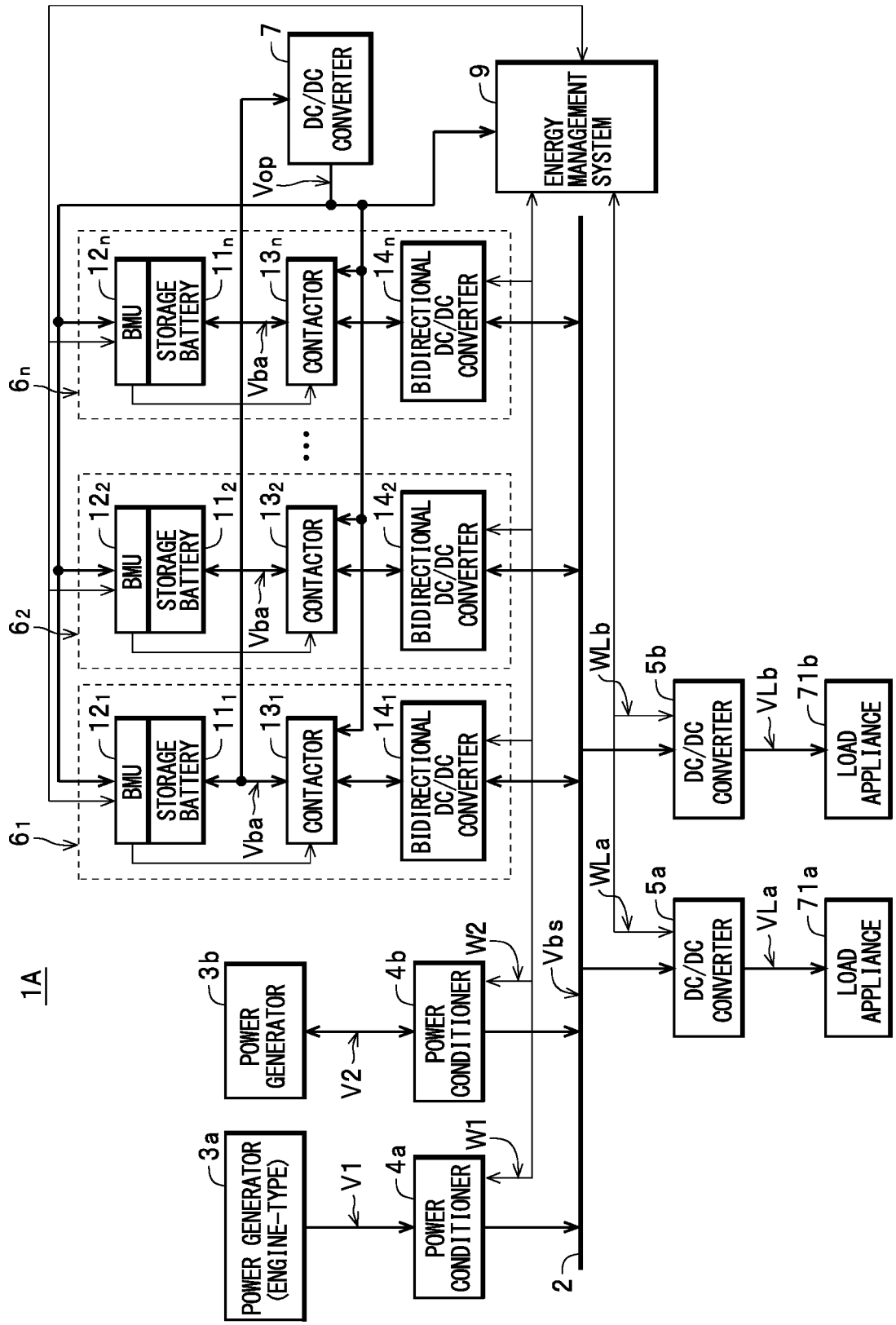
FIG. 1 is a diagram depicting the configuration of a DC power supplying system 1A.

Preferred embodiments of a DC power supplying system will now be described with reference to the attached drawings. Note that the DC power supplying system according to the present invention is not limited to the embodiments described below. The component elements described below also include component elements that would be obvious to those skilled in the art and component elements that are effectively the same, with it also being possible to combine such component elements as appropriate.

First, the configuration of a DC power supplying system 1A as a DC power supplying system according to the present invention will be described.

The DC power supplying system 1A includes a DC bus 2, one or two or more power generators 3 (as one example in the present embodiment, two power generators 3a and 3b, hereinafter collectively referred to as the "power generators 3" when no distinction is made between them), first converters 4 disposed corresponding to the power generators 3 (as one example in the present embodiment, two power conditioners 4a and 4b described later), second converters 5 (as one example in the present embodiment, two second converters 5a and 5b described later, hereinafter collectively referred to as the "second converters 5" when no distinction is made between them) disposed corresponding to load appliances 71 connected to the DC power supplying system 1A (as one example in the present embodiment, two load appliances 71a and 71b, hereinafter collectively referred to as the "load appliances 71" when no distinction is made between them), a plurality of DC power supplies 6 (DC power supplies $6_1, 6_2, \ldots, 6_n$), a third converter 7, and an energy management system 9. The DC power supplying system 1A is configured as a standalone DC power supplying system that is capable of generating a DC voltage based on the power generated by the power generators 3 and supplying to the one or two or more load appliances 71 (that is, a DC power supplying system that is not connected to commercial power (that is, commercial AC power)).

The DC bus 2 is laid out along the installed locations of the power generators 3, the installed locations of the DC power supplies 6, and the installed locations of the load appliances 71, and functions as a bus line for supplying DC power. In addition, due to the energy management system 9 controlling charging/discharging operations of bidirectional DC/DC converters 14, described later, provided inside the plurality of DC power supplies 6, the DC bus 2 is set at a bus voltage Vbs in a predetermined voltage range that includes a nominal bus voltage (as one example, in a voltage range of DC 340V to DC 400V inclusive, including DC 370V as the nominal bus voltage).

The power generators 3 are constructed of distributed power supplies. The distributed power supplies can be composed of power generators that use natural renewable energy, such as solar power generators and wind power generators, and engine-based power generators that use fossil fuel energy, such as diesel or gasoline. In the present embodiment, for ease of understanding, the power generators 3 include one power generator 3a that is engine-based and one power generator 3b that uses natural renewable energy. The power generator 3a is started and stopped by (manual) operations by an operator, and in the operating state, generates and outputs an AC voltage V1 of a predetermined voltage value. It is also possible to control starting and stopping using the energy management system 9. The power generator 3a is operated when a large amount of charging power is temporarily necessary in order to charge storage batteries 11, described later, included in the plurality of DC power supplies 6, such as when the DC power supplying system 1 is first started up and when the DC power supplying system 1 is restarted after an extended stoppage. For this reason, as one example in the present embodiment, it is assumed that the power generator 3a is configured so as to be capable of generating enough power to sufficiently charge the storage batteries 11 while supplying load power to the load appliances 71. The power generator 3b is composed of one or two or more solar power generators, for example, and automatically generates power during daytime to generate and output a DC voltage V2.

The first converter 4 is constructed of two power conditioners 4a and 4b disposed corresponding to the two power generators 3a and 3b in the present embodiment. As one example in the present embodiment, the power conditioner 4a is constructed so as to include an AC/DC converter and is disposed corresponding to the power generator 3a. The power conditioner 4a operates on a DC voltage that is internally generated based on the AC voltage V1, is controlled by the energy management system 9, converts the AC voltage V1 as the generated power outputted from the power generator 3a to the bus voltage Vbs (as one example, for the first converter 4, a voltage that is below the upper limit voltage value of the predetermined voltage range but exceeds the nominal bus voltage, that is, a voltage in the vicinity of the upper limit voltage value) and supplies the bus voltage Vbs to the DC bus 2. The power conditioner 4a also has a power measuring function that measures generated power W1 supplied from the power generator 3a to the DC bus 2 (that is, measures for a predetermined cycle T (as one example, a period of several seconds to several minutes)) and outputs to the energy management system 9.

As one example, the power conditioner 4b includes a DC/DC converter and is disposed corresponding to the power generator 3b. The power conditioner 4b operates on a DC voltage that is internally generated based on the DC voltage V2, is controlled by the energy management system 9 to control the generated power by controlling power generating operations of the corresponding power generator 3b, converts the DC voltage V2 as the generated power outputted from the power generator 3b to the bus voltage Vbs, and supplies the bus voltage Vbs to the DC bus 2. The power conditioner 4b also has a power measuring function that measures generated power W2 supplied from the power generator 3b to the DC bus 2 (that is, measures for the cycle T, for example) and outputs to the energy management system 9.

As one example, the second converters 5 are constructed of DC/DC converters that operate on a DC voltage that is internally generated based on the bus voltage Vbs. In the present embodiment, for ease of understanding, it is assumed for example that the load appliances 71 (DC loads) connected to the DC power supplying system 1A are the two load appliances 71a and 71b and that the second converters 5 are composed of a second converter 5a (also referred to as the "DC/DC converter 5a") corresponding to the load appliance 71a and a second converter 5b (also referred to as the "DC/DC converter 5b") corresponding to the load appliance 71b. Here, the DC/DC converter 5a is controlled by the energy management system 9, converts the bus voltage Vbs to a load voltage VLa that is the DC voltage to be used by the load appliance 71a (DC voltage conversion) and supplies the load voltage VLa to the load appliance 71a. The DC/DC converter 5a has a current limiting function that limits the load current supplied from the DC bus 2 to the load appliance 71a to an upper limit current value set from the energy management system 9. The DC/DC converter 5a also has a power measuring function that measures load power WLa supplied from the DC bus 2 to the load appliance 71a based on the load voltage VLa and the load current (as one example, measurement in the cycle T) and outputs the load power WLa to the energy management system 9.

The DC/DC converter 5b is controlled by the energy management system 9, converts the bus voltage Vbs to a load voltage VLb that is the DC voltage to be used by the load appliance 71b (DC voltage conversion) and supplies the load voltage VLb to the load appliance 71b. The DC/DC converter 5b has a current limiting function that limits the load current supplied from the DC bus 2 to the load appliance 71b to an upper limit current value set from the energy management system 9. The DC/DC converter 5b also has a power measuring function that measures load power WLb supplied from the DC bus 2 to the load appliance 71b based on the load voltage VLb and the load current (as one example, measurement in the cycle T) and outputs the load power WLb to the energy management system 9.

Note that the load appliances 71a and 71b are DC loads that receive and operate on a supplying of the load voltages VLa and VLb that are DC voltages (hereinafter referred to as the "load voltages VL" when no distinction is made between them), and as examples, the load appliances 71a and 71b are composed of lighting equipment that operates on a DC voltage, home appliances such as televisions and refrigerators that operate on a DC voltage, and information devices, such as personal computers and mobile terminals that operate on a DC voltage.

n (where n is an integer of 2 or higher) DC power supplies $6_1, 6_2, \ldots, 6_n$ (hereinafter collectively referred to as the "DC power supplies 6" when no distinction is made between them) are disposed as the DC power supplies 6. Each DC power supply 6 includes a storage battery 11, a battery management unit (BMU) 12, a contactor 13, and a bidirectional DC/DC converter 14. Storage batteries $11_1, 11_2, \ldots, 11_n$ (hereinafter, also referred to as the "storage batteries 11" when no particular distinction is made between them) each have a specified power capacity (nominal capacity (rated charging capacity)), and are configured so as to be able to perform charging operations and discharging operations within a predetermined working voltage range including the nominal voltage.

Although one of the storage batteries 11 (as one example in the present embodiment, the storage battery $11_1$) is also used to supply power to the DC bus 2, the storage batteries $11_1$ mainly function as storage batteries that supply power (an operating voltage Vop) for operations by the BMUs 12 and contactors 13 of the respective DC power supplies $6_1$ to $6_n$ and also the energy management system 9. For this reason, in operating states aside from a sleep state, described later, and a state where a contactor $13_1$ corresponding to the storage battery $11_1$ has been placed in the cutoff state, charging and discharging control of the storage battery $11_1$ is performed by the energy management system 9 so that the charging voltage Vba becomes equal to or above a voltage threshold set in advance that exceeds a lower limit value of the working voltage range of the storage battery $11_1$ but is below an upper limit value of the working voltage range of the storage battery $11_1$. Also, unlike the other storage batteries $11_2$ to $11_n$, the storage battery $11_1$ is charged and discharged by a bidirectional DC/DC converter $14_1$ that performs a CV operation as described later. Since this means that the storage battery $11_1$ typically has a higher number of charging/discharging cycles than the other storage batteries $11_2$ to $11_n$, the storage battery $11_1$ uses a high-cost storage battery (as examples, a lithium ion battery or a NaS battery (sodium sulfur battery)) that hardly deteriorates even when the number of charging/discharging cycles is high (that is, has a working life that is barely affected by the number of charging/discharging cycles). Note that although it is preferable to minimize the number of high-cost secondary storage batteries (that is, only the solitary storage battery $11_1$) as in the present embodiment to suppress the rise in device cost of the DC power supplying system 1A, it is also possible to increase the number within a permitted range.

On the other hand, the storage batteries $11_2$ to $11_n$ as the first storage batteries aside from the storage battery $11_1$ are mainly used for supplying power to the DC bus 2, and are numerous. For this reason, the storage batteries $11_2$ to $11_n$ are typically constructed of storage batteries, such as lead acid storage batteries and a nickel-metal hydride batteries, that have a large capacity and are inexpensive. As one example in the present embodiment, the storage batteries $11_2$ to $11_n$ are constructed of storage batteries of the same type and the same capacity (that is, the same nominal capacity). However, even with storage batteries that have the same nominal capacity, there are individual differences (fluctuations) in the actual fully charged capacities. It is assumed here that the actual fully charged capacity of each of the storage batteries $11_2$ to $11_n$ is measured in advance using a known method of measurement (as one example, a current integration method (a Coulomb counting method)) and is stored in the energy management system 9. Note that although storage batteries that have different nominal capacities can also be used as the storage batteries $11_2$ to $11_n$, in this case also, it is assumed that the actual fully charged capacities of the storage batteries $11_2$ to $11_1$ are measured in advance and stored in the energy management system 9.

BMUs $12_1, 12_2, \ldots, 12_n$ (hereinafter collectively referred to as the "BMUs 12" when no distinction is made between them) are disposed for the corresponding storage batteries $11_1, 11_2, \ldots, 11_n$ and operate on the operating voltage Vop, described later. In the operating state, as one example, each BMU 12 has a function that measures the charging voltage Vba of the storage battery 11, a function that calculates the SOC (State Of Charge, or remaining battery level (remaining capacity)) by measuring a current value of a charging/discharging current of the storage battery 11, and a function that outputs, with a predetermined cycle T, information including the measured charging voltage Vba and/or current value of the charging/discharging current and/or the calculated SOC to the energy management system 9 as battery information. Each BMU 12 also has a function that executes, when contactor control information has been inputted from the energy management system 9, a control content over the contactor 13 as indicated by the contactor control information (when the control content is a cutoff instruction, the contactor 13 is placed in the cutoff state and when the control content is a connection instruction, the contactor 13 is placed in the connection state). Note that a data table that indicates the relationship between the charging voltage Vba and the SOC for the corresponding storage battery 11 (a relationship where the SOC increases as the charging voltage Vba increases) is stored in advance in each BMU 12. Each BMU 12 is configured to refer to the data table to find (calculate) the present SOC from the measured charging voltage Vba.

The contactors $13_1, 13_2, \ldots, 13_n$ (hereinafter collectively referred to as the "contactors 13" when no distinction is made between them) are disposed between the positive electrode and the negative electrode of the corresponding storage batteries $11_1, 11_2, \ldots, 11_n$ and a pair of input/output terminals on the storage battery $11_1, 11_2, \ldots, 11_n$-sides of the corresponding bidirectional DC/DC converters $14_1, 14_2, \ldots, 14_n$ and operate on the operating voltage Vop described later. The respective contactors 13 are controlled by the corresponding BMUs 12 to enter an arbitrary state out of the cutoff state and the connection state. When in the cutoff state, the contactors 13 cut off (that is, disconnect) the positive electrode and the negative electrode from the pair of input/output terminals, and when in the connection state, the contactors 13 connect the positive electrode and the negative electrode to the pair of input/output terminals.

The bidirectional DC/DC converters $14_1, 14_2, \ldots, 14_n$ (hereinafter collectively referred to as the "bidirectional DC/DC converters 14" when no distinction is made between them) connect (that is, are disposed) between the storage batteries 11 and the DC bus 2 by each having a pair of input/output terminals on the storage battery 11 side (that is "a first pair of input/output terminals") connected via a contactor 13 to a storage battery 11 and a second pair of input/output terminals connected to the DC bus 2. As the bidirectional DC/DC converters 14, as one example it is possible to use the known bidirectional DC/DC converters disclosed in Japanese Laid-open Patent Publication No. 2016-152641.

The bidirectional DC/DC converter $14_1$ as the "second bidirectional converter" for the present invention performs a CV operation (constant voltage charging/discharging operation) on a DC voltage that is internally generated based on the bus voltage Vbs and is subjected to operation control by the energy management system 9. The other bidirectional DC/DC converters $14_2, \ldots, 14_n$ (hereinafter collectively referred to as the "DC/DC converters $14_2$ and the like" when no distinction is made between them) as the "first bidirectional converter" for the present invention perform a CC operation (constant current charging/discharging operation) on a DC voltage that is internally generated based on the bus voltage Vbs and are subjected to operation control by the energy management system 9.

In more detail, when the control information received from the energy management system 9 is a charging instruction, the bidirectional DC/DC converter $14_1$ steps up or steps down (that is, performs voltage conversion for) the bus voltage Vbs inputted from the second pair of input/output terminals and outputs from the first pair of input/output terminals to the storage battery 11 to charge the storage battery 11 (that is, a charging operation is performed). Due to this, the bus voltage Vbs of the DC bus 2 falls. On the other hand, when the received control information is a discharging instruction, the bidirectional DC/DC converter $14_1$ steps up or steps down (that is, performs voltage conversion for) the charging voltage Vba of the storage battery 11, inputted from the first pair of input/output terminals to as one example a voltage value that is in the vicinity of the upper voltage limit of the predetermined voltage range for the bus voltage Vbs, and outputs to the DC bus 2 from the second pair of input/output terminals to discharge the storage battery 11 (that is, a discharging operation is performed). Due to this, the bus voltage Vbs of the DC bus 2 rises.

When the control information received from the energy management system 9 is a charging instruction, each bidirectional DC/DC converter $14_2$ and the like steps up or steps down (that is, performs voltage conversion for) the bus voltage Vbs inputted from the second pair of input/output terminals and outputs from the first pair of input/output terminals to a storage battery 11 to charge the storage battery 11 by supplying a charging current with a designated current value (a current value corresponding to the "charging rate" described later) included in the control information (that is, a charging operation is performed with a constant current). Due to this, the bus voltage Vbs of the DC bus 2 falls. On the other hand, when the received control information is a discharging instruction, each bidirectional DC/DC converter $14_2$ and the like steps up or steps down (that is, performs voltage conversion for) the charging voltage Vba of the storage battery 11 inputted from the first pair of input/output terminals and outputs to the DC bus 2 from the second pair of input/output terminals to cause the storage battery 11 to output a discharging current with a designated current value (a current value corresponding to the "discharging rate" described later) included in the control information (that is, the storage battery 11 is discharged, a discharging operation is performed with a constant current). Due to this, the bus voltage Vbs of the DC bus 2 rises.

When the control information is a stopping instruction, the bidirectional DC/DC converters 14 enter a sleep state where the operation of the bidirectional DC/DC converters 14 is stopped to reduce power consumption. When a bidirectional DC/DC converter 14 in the sleep state receives a charging instruction or a discharging instruction as control information, the bidirectional DC/DC converter 14 exits the sleep state and executes a charging operation or a discharging operation. Each bidirectional DC/DC converter 14 also has a current limiting function that limits the current values of the charging current supplied to the storage battery 11 and the discharging current when discharging from the storage battery 11 to a maximum current value of the storage battery 11 or below (as described later, as one example in the present embodiment, 45A).

The third converter 7 is composed of a DC/DC converter (and is hereinafter also referred to as the "DC/DC converter 7"). A pair of input terminals of the DC/DC converter 7 are connected to the positive electrode and the negative electrode of the storage battery $11_1$ of the DC power supply $6_1$ without passing via the contactor $13_1$, and the DC/DC converter 7 operates on the charging voltage Vba of the storage battery $11_1$. In the operating state, the DC/DC converter 7 steps up or steps down (that is, performs voltage conversion for) the charging voltage Vba of the storage battery 11 to generate and output the operating voltage Vop to be used by the BMU 12 and the contactor 13 of each DC power supply 6 and also the energy management system 9.

The energy management system 9 is composed of a computer that operates on the operating voltage Vop and functions as a controller. The energy management system 9 executes a charging/discharging control process for each DC power supply 6, a power generation control process over the power generators 3 (the other power generators 3 aside from the power generator 3a that is subjected to manual operation control, which in the present embodiment means the power generator 3b), and a power control process over the second converters 5. The energy management system 9 also executes a voltage measuring process that measures the bus voltage Vbs. Here, the energy management system 9 may use a configuration that directly measures the bus voltage Vbs, and as another example, it is also possible to use a configuration where a first converter 4 (that is, at least one out of the power conditioners 4a and 4b) has a function that measures the bus voltage Vbs in addition to generating power and outputs to the energy management system 9 and the energy management system 9 indirectly measures the bus voltage Vbs via the first converter 4.

Each of the storage batteries $11_2$ to $11_n$ has a characteristic in that the actual fully charged capacity Y gradually decreases from the initial battery capacity (or "specification-based battery capacity Wsp") in keeping with usage (that is, with the passage of time). For this reason, the energy management system 9 executes a capacity calculation process that calculates the present fully charged capacity Y of each of the storage batteries $11_2$ to $11_n$. In this capacity calculation process, the energy management system 9 executes a cycle measurement process that measures the present number of cycles m (that is, the number of charging and discharging cycles) for each of the storage batteries $11_2$ to $11_n$ and simultaneously calculates the present fully charged capacity Y from the specification-based battery capacity Wsp and the present number of cycles m that has been measured. In the DC power supplying system 1A according to the present embodiment, as will be described later, the storage batteries $11_2$ to $11_n$ are charged with a common charging rate and are discharged with a common discharging rate, and for this reason, the present number of cycles m being measured by the power management apparatus 9 will be substantially the same for each of the storage batteries $11_2$ to $11_n$. The rate of fall α in the battery capacity per cycle is known for each of the storage batteries $11_2$ to $11_n$, and it is assumed that this rate of fall α and the specification-based battery capacity Wsp are stored in advance in the energy management system 9 in association with each of the storage batteries $11_2$ to $11_n$. As one example, for a storage battery 11 whose specification-based battery capacity Wsp is 60 Ah and whose rate of fall α is 0.01%, when the present number of cycles m is 1000, the energy management system 9 calculates the present fully charged capacity Y for that storage battery 11 in the capacity calculation process as follows.

$$Y = Wsp \times (1 - \alpha/100)^m$$
$$= 60 \times (1 - 0.01/100)^{1000}$$
$$= 54.29 \text{ Ah}$$

In the cycle measurement process, the energy management system 9 integrates the charging amount (Ah) and discharging amount (Ah) of each storage battery 11 from the start of measurement of a new cycle for each storage battery 11, and for a storage battery 11 where the integrated value (or the "integrated charging value") of the charge amount (Ah) and the integrated value (or the "integrated discharging value") of the discharge amount (Ah) have both reached the present fully charged capacity Y, regards the measured cycle as complete and adds one to the number of cycles m of that storage battery 11. As one example, when the present fully charged capacity Y at the time where measurement of a cycle for a given storage battery 11 newly starts is 60 Ah and the present remaining charge is 40 Ah, if discharging is performed until the remaining charge is 10 Ah (that is, discharging of a discharging amount of 30 Ah), the energy management system 9 calculates the integrated discharging value as 30 Ah (the integrated charging value at this time is 0 Ah). Following this, if the energy management system 9 executes charging until the remaining charge is 50 Ah (charging with a charging amount of 40 Ah) and discharging until the remaining charge is 10 Ah (discharging of a discharging amount of 40 Ah), the energy management system 9 integrates the integrated charging value to 40 Ah, and integrates the integrated discharging value to 70 Ah (=30 Ah+40 Ah).

In this case, when the remaining charge reaches 20 Ah during the second execution of discharging (hereinafter, referred to as the "first timing" for ease of explanation) the energy management system 9 calculates the integrated discharging value as 60 Ah (that is, the present fully charged capacity, which is 60 Ah, is reached). However, since the integrated charging value that has been integrated up to this first timing is 40 Ah and has therefore not reached the present fully charged capacity of 60 Ah, the energy management system 9 determines that the cycle being measured is not complete. If after this, the energy management system 9 executes charging until the charging amount reaches 60 Ah (that is, a charging with a charging amount of 50 Ah), at a point where the remaining charge reaches 30 Ah during this second execution of charging (hereinafter, referred to as the "second timing" for ease of explanation), the integrated charging value will be calculated as 60 Ah (=40 Ah+20 Ah) (that is, the present fully charged capacity which is 60 Ah is reached). Since both the integrated charging value and the integrated discharging value have reached the present fully charged capacity of 60 Ah at this second timing, the energy management system 9 determines that the cycle being measured is complete and adds one to the number of cycles m.

The energy management system 9 may use a configuration where during the cycle measurement process, measurement of a new cycle starts from this second timing and at this start of measurement, both the integrated charging value and the integrated discharging value that have been integrated up to that point are always returned to zero. It is also possible to use a configuration where the integrated value for the latter of the integrated charging value and the integrated discharging value to reach the present fully charged capacity Y is always returned to zero, but for the other integrated value that had already reached the present fully charged capacity Y (that is, the other integrated value that exceeds the present fully charged capacity Y), the difference with the present fully charged capacity Y (=other integrated value—present fully charged capacity Y) is set as the initial value for the other integrated value in the measurement in the new cycle.

As one example, when this latter configuration is used for the specific case described above (that is an example where the storage battery 11 has a present fully charged capacity of 60 Ah, and 30 Ah of discharging, 40 Ah of charging, 40 Ah of discharging, and 50 Ah of charging are executed starting from a state where the remaining charge is 40 Ah), at the second timing where measurement of a new cycle starts, the energy management system 9 returns the integrated charging value that latterly reached the present fully charged capacity 60 Ah to zero, and sets the difference of 10 Ah (=70 Ah-60 Ah) between the integrated discharging value that already reached the present fully charged capacity of 60 Ah and is now 70 Ah and the present fully charged capacity of 60 Ah as the initial value of the integrated discharging value, and starts measurement in the new cycle. With this latter configuration, compared with the former configuration (that is, a configuration where both the integrated charging value and the integrated discharging value are always returned to zero), it is possible to measure the following new cycle so as to reflect the remaining amount of charging or discharging (that is, the difference with the present fully charged capacity Y) during measurement in the immediately preceding cycle, which means it is possible to measure the cycles more accurately (that is, more accurate measurement of the number of cycles m is possible). On the other hand, with the former configuration (where both the integrated charging value and the integrated discharging value are always returned to zero), the cycle measurement process can be executed more easily, so that when the number of storage batteries 11 is extremely large for example, using the former configuration has a merit of reducing the load required to calculate the number of cycles m at the energy management system 9.

Next, the operation of the DC power supplying system 1A depicted in FIG. 1 will be described. Note that since the storage battery $11_1$ is used as described above to supply power to component elements such as the energy management system 9, it is assumed that charging has been performed in advance so that the charging voltage Vba is below the upper limit value of the working voltage range and is equal to or above the voltage threshold. It is also assumed that the other storage batteries $11_2$ to $11_n$ have the same SOC. As one example, when there are three storage batteries 11 whose present fully charged capacities Y are 100 Ah, 95 Ah, and 105 Ah, respectively, when the SOC of the 100 Ah storage battery 11 is 50% (that is, when the present remaining charge is 50 Ah), it is assumed that the SOC of the 95 Ah storage battery 11 is also 50% (that is, the present remaining charge is 47.5 Ah), and the SOC of the 105 Ah storage battery 11 is also 50% (that is, the present remaining charge is 52.5 Ah). It is also assumed that the respective contactors 13 are in the cutoff state at the start.

With the DC power supplying system 1A, when the DC power supplying system 1A is first driven, when the DC power supplying system 1A is restarted after an extended stoppage, or the like, in an imaginary case where the storage batteries $11_2$ to $11_n$ aside from the storage battery $11_1$ are in an overdischarged state (that is, a state where the charging voltage Vba is below the lower limit value of the working voltage range), the power generator 3a first operates for a certain period to output the AC voltage V1. For this reason, the power conditioner 4a operates on being supplied with the AC voltage V1, converts the AC voltage V1 to the bus voltage Vbs, and supplies the bus voltage Vbs to the DC bus 2. Accordingly, the bus voltage Vbs of the DC bus 2 rises to within a predetermined voltage range (the voltage range from DC 340V to DC 400V inclusive). In the present embodiment, since the power conditioner 4a outputs the bus voltage Vbs with a voltage in the vicinity of the upper limit value of the voltage range, the bus voltage Vbs of the DC bus 2 rises to a voltage in the vicinity of the upper limit value. The power conditioner 4a also measures the generated power W1 supplied from the power generator 3a to the DC bus 2 and outputs to the energy management system 9.

In the daytime, the power generator 3b automatically generates power and outputs the DC voltage V2. Due to this, the power conditioner 4b operates on being supplied with the DC voltage V2, converts the DC voltage V2 to the bus voltage Vbs, and supplies the bus voltage Vbs to the DC bus 2. Accordingly, compared to a case where only the power generator 3a is operating, the bus voltage Vbs of the DC bus 2 rises to within the predetermined voltage range described above in a shorter time. The power conditioner 4b also measures the generated power W2 supplied from the power generator 3b to the DC bus 2 and outputs to the energy management system 9.

In this DC power supplying system 1A, the DC/DC converter 7 that receives the supplying of the charging voltage Vba from the storage battery $11_1$ operates and outputs (supplies) the operating voltage Vop to the BMU 12 and the contactor 13 of each DC power supply 6 and also to the energy management system 9. This means that the BMU 12 and the contactor 13 of each DC power supply 6 and the energy management system 9 are placed in the operating state.

Accordingly, the BMUs $12_1$ to $12_n$ of the DC power supplies $6_1$ to $6_n$ measure the charging voltage Vba, the SOC, and the like of the corresponding storage batteries $11_1$ to $11_n$ with the cycle T and output to the energy management system 9 as the battery information every time measurement is performed.

The energy management system 9 also executes the cycle measurement process to measure the number of cycles m for each storage battery 11 and executes the capacity calculation process to calculate the present fully charged capacity Y of each storage battery 11 based on the measured number of cycles m, the specification-based battery capacity Wsp, and the rate of fall α.

The energy management system 9 also executes the charging/discharging control process while executing the voltage measuring process to measure the bus voltage Vbs.

In the charging/discharging control process when the power generator 3a is operating, the energy management system 9 calculates the total generated power (W1+W2) every time a new generated power W1 is acquired from the power conditioner 4a on the power generator 3a side (and when the power generator 3b is operating, every time a new generated power W2 is acquired from the power conditioner 4b on the power generator 3b side).

When the total generated power (W1+W2) is equal to or above a standard power set in advance, the energy management system 9 determines that it is possible to supply power to the load appliances 71 and executes control that causes the DC/DC converters 5a and 5b to convert and output the bus voltage Vbs so as to become the load voltages VLa and VLb used by the corresponding load appliances 71a and 71b. In the present embodiment, as described above, since the power generator 3a is configured so as to be capable of generating an amount of power that makes it possible to simultaneously execute the supplying of power to the load appliances 71 and charging of the storage batteries 11, the total generated power (W1+W2) will be equal to or above the standard power. For this reason, the energy management system 9 executes control of the DC/DC converters 5a and 5b to convert and output the bus voltage Vbs to become the load voltages VLa and VLb used by the corresponding load appliances 71a and 71b. In keeping with this, the DC/DC converters 5a and 5b execute the supplying of load power to the corresponding load appliances 71a and 71b. The DC/DC converters 5a and 5b also measure the load power WLa and WLb supplied to the corresponding load appliances 71a and 71b and output to the energy management system 9. Every time new load power WLa and WLb are acquired, the energy management system 9 calculates the total load power (WLa+WLb).

The energy management system 9 compares the calculated total generated power (W1+W2) and the total load power (WLa+WLb) and when the total generated power (W1+W2) is above the total load power (WLa+WLb), determines that it is possible for the respective DC power supplies 6 to charge the storage batteries 11. Since the power generator 3a in the present embodiment is constructed so as to be capable of generating an amount of power that makes it possible to simultaneously execute the supplying of power to the load appliances 71 and charging of the storage batteries 11, the total generated power (W1+W2) will exceed the total load power (WLa+WLb) and the energy management system 9 will determine that it is possible to charge the storage batteries of the respective DC power supplies 6.

Here, the energy management system 9 specifies which DC power supplies 6 have chargeable storage batteries 11 based on the battery information acquired from the BMU 12 of each DC power supply 6 (that is, storage batteries 11 whose charging voltage Vba has not reached the upper limit value of the working voltage range, or in other words, storage batteries 11 whose SOC has not reached 100%), outputs contact control information indicating a connection instruction to the BMUs 12 of the specified DC power supplies 6, and outputs control information indicating a charging instruction to the bidirectional DC/DC converters 14 of these DC power supplies 6 (that is, the energy management system 9 executes a charging operation). As the SOC of each storage battery 11, in the present embodiment the energy management system 9 uses the SOC included in the battery information acquired from the corresponding BMU 12. However, it is also possible to use a configuration where the present remaining charge of each storage battery 11 is calculated from the integrated charging value and the integrated discharging value for each storage battery 11 calculated in the cycle measurement process and the SOC of each storage battery 11 is calculated and used based on the present fully charged capacity Y of each storage battery 11 and this calculated remaining charge of each storage battery 11.

In the present embodiment, at this time, since the storage batteries $11_2$ to $11_n$ aside from the storage battery $11_1$ are in an overdischarged state and the charging voltage Vba of the storage battery $11_1$ is also below the upper limit value of the working voltage range, the energy management system 9 detects that none of the storage batteries 11 are fully charged (that is, all of the storage batteries 11 are in a chargeable state) based on the charging voltages Vba of the respective storage batteries 11 included in the battery information (the SOC of each storage battery 11 included in the battery information may be used instead).

For this reason, the energy management system 9 outputs contact control information indicating a connection instruction to the BMUs $12_1$ to $12_n$ of all of the DC power supplies $6_1$ to $6_n$ and outputs control information indicating a charging instruction to the bidirectional DC/DC converters $14_1$ to $14_n$ of all of the DC power supplies $6_1$ to $6_n$. When doing so, the energy management system 9 includes designated current values (current values that produce a common rate (or the "charging rate") during charging of the storage batteries $11_2$ to $11_n$) that specify the current values of charging currents supplied to the storage batteries $11_2$ to $11_n$ during a charging operation in the control information outputted to the CC-type bidirectional DC/DC converters $14_2$ to $14_n$ of the DC power supplies $6_2$ to $6_n$.

The "rate" referred to here is expressed as a ratio for a current value during charging or discharging a storage battery 11, relative to a standard which is the current value when the fully charged capacity (the actual full capacity) of a storage battery is charged or discharged for one hour. Here, the current value used as a standard for charging or discharging for one hour (also referred to as the standard current value) is indicated as "1C". Accordingly, numerical values indicating the present fully charged capacity Y for each storage batteries $11_2$ to $11_n$ calculated by the energy management system 9 executing the capacity calculation process also indicate the 1C current values (the standard current values) for the respective storage batteries $11_2$ to $11_n$. To illustrate the rate by way of a specific example, a charging rate of 0.5C for example means that the current value of the charging current is equal to 50% of the standard current value (a numerical value indicating the present fully charged capacity Y). The same applies to the rate during discharging (also referred to as the "discharging rate"). A discharging rate of 0.4C means that the current value of the discharging current is 40% of the standard current value.

The energy management system 9 calculates the individual designated current values for the bidirectional DC/DC converters $14_2$ to $14_n$ as described below.

The energy management system 9 first calculates a power surplus (=total generated power (W1+W2)-total load power (WLa+WLb), that is, the "power difference") for the total generated power (W1+W2), and by dividing this calculated power surplus by the measured bus voltage Vbs, calculates the surplus current (=power surplus/bus voltage Vbs) of the entire DC power supplying system 1A.

Next, the energy management system 9 uses an amount of power corresponding to a predetermined proportion of surplus current (hereinafter also referred to as the "specified surplus current") out of the entire calculated surplus current as power for charging the storage battery $11_1$. For this reason, the energy management system 9 calculates a remaining surplus current produced by subtracting the specified surplus current from the entire calculated surplus current (as one example, when the proportion described above of the specified surplus current is 10%, the remaining 90% of the surplus current obtained by subtracting the 10% specified surplus current from the entire calculated surplus current (hereinafter, also referred to as the "remaining surplus current")) as the surplus current for charging the storage batteries $11_2$ to $11_a$. In this way, by using a configuration where an amount of power corresponding to the specified surplus current out of the entire calculated surplus current is always assigned for charging the storage battery $11_1$ and any remaining surplus current that is left is used for charging the storage batteries $11_2$ to $11_n$, charging of the storage battery $11_1$ is preferentially executed in this DC power supplying system 1A. For this reason, the storage battery $11_1$ is constantly charged so that the charging voltage Vba is in the vicinity of the upper limit value of the working voltage range.

Next, the energy management system 9 calculates the common charging rate Ra per hour by calculating the sum of the present fully charged capacities Y of the storage batteries $11_2$ to $11_n$ and dividing the remaining surplus current for charging the storage batteries $11_2$ to $11_n$ described above by this sum. As one example, when there are three storage batteries 11 whose present fully charged capacities Y have been calculated as 100 Ah, 95 Ah, and 105 Ah and the remaining surplus current is 200 A, the formula $$100 \times Ra + 95 \times Ra + 105 \times Ra = 200$$

holds. Accordingly, the energy management system 9 calculates the charging rate Ra as follows.

$$0.667C (=200/(100+95+105))$$

Finally, the energy management system 9 calculates an individual designated current value for each of the bidirectional DC/DC converters $14_2$ to $14_n$ in the cycle T based on this charging rate Ra. In more detail, the energy management system 9 multiplies the present fully charged capacities Y of the storage batteries $11_2$ to $11_n$ corresponding to the bidirectional DC/DC converters $14_2$ to $14_n$ by this common charging rate Ra to calculate the individual designated current values for the bidirectional DC/DC converters $14_2$ to $14_n$. As one example, when there are three storage batteries 11 whose present fully charged capacities Y have been calculated as 100 Ah, 95 Ah, and 105 Ah and the charging rate Ra is 0.667C, the designated current value for the bidirectional DC/DC converter 14 corresponding to the 100 Ah storage battery 11 is calculated as 66.7 A (=0.667×100), the designated current value for the bidirectional DC/DC converter 14 corresponding to the 95 Ah storage battery 11 is calculated as 63.365 A (=0.667×95), and the designated current value for the bidirectional DC/DC converter 14 corresponding to the 105 Ah storage battery 11 is calculated as 70.035 A (=0.667×105).

In this way, due to the energy management system 9 outputting contact control information indicating a connection instruction to the BMUs $12_1$ to $12_n$ of all of the DC power supplies $6_1$ to $6_n$ and outputting control information indicating a charging instruction to the bidirectional DC/DC converters $14_1$ to $14_n$ of all of the DC power supplies $6_1$ to $6_n$, the contactor 13 in each DC power supply 6 is placed in a connection state, the storage battery $11_1$ is connected via the contactor $13_1$ in the connection state to the CV-type bidirectional DC/DC converter $14_1$ that performs a charging operation, and as a result, constant voltage charging is executed for the storage battery $11_1$. The storage batteries $11_2$ to $11_n$ are connected via the contactors $13_2$ to $13_n$ in the connection state to the CC-type bidirectional DC/DC converters $14_2$ to $14_n$ that perform a charging operation, and as a result, constant current charging with the same charging rate is executed for the storage batteries $11_2$ to $11_n$.

Here, the energy management system 9 detects whether the charging voltage Vba included in the battery information outputted in the cycle T from the BMUs 12 of the DC power supplies 6 has reached the upper limit value of the working voltage range (or whether the SOC included in the battery information has reached 100%, that is, whether a storage battery 11 has reached a fully charged state) and on determining that a fully charged state has been reached, the energy management system 9 outputs contact control information indicating a cutoff instruction to the BMU 12 of the DC power supply 6 that includes that storage battery 11 to place that contactor 13 in a cutoff state and thereby disconnect that storage battery 11 from the bidirectional DC/DC converter 14. By doing so, overcharging of the storage batteries 11 is prevented.

When charging the storage batteries $11_2$ to $11_n$ in the cycle T after the completion of charging of the storage battery $11_1$ that was preferentially performed in this way (that is, when the storage battery $11_1$ has become fully charged), the energy management system 9 sets the specified surplus current at zero and calculates the individual designated current values for the bidirectional DC/DC converters $14_2$ to $14_n$ to execute the charging/discharging control process that continues the charging of the storage batteries $11_2$ to $11_n$.

During execution of the charging/discharging control process, by amending, based on the bus voltage Vbs measured by the voltage measuring process, the designated current value for the bidirectional DC/DC converters $14_2$ to $14_n$ that perform a CC operation that was calculated as described above to set the final designated current value (that is, the designated current value to be included in the control information to be actually sent to the bidirectional DC/DC converters $14_2$ to $14_n$), that is, by controlling the designated current value for the bidirectional DC/DC converters $14_2$ to $14_n$, the energy management system 9 keeps the bus voltage Vbs in a predetermined voltage range.

As one example, when the measured bus voltage Vbs has risen and is above an intermediate value in the predetermined voltage range, the energy management system 9 increases the common charging rate for the storage batteries $11_2$ to $11_n$ (in more detail, current values that have been amended so as to increase the calculated designated current values for the bidirectional DC/DC converters $14_2$ to $14_n$ that perform a CC operation are set as the final designated current values of the bidirectional DC/DC converters $14_2$ to $14_n$). By doing so, the power supplied from the DC bus 2 to the bidirectional DC/DC converters $14_2$ to $14_n$ that perform a CC operation is increased, which suppresses the rise in the bus voltage Vbs. On the other hand, when the measured bus voltage Vbs has fallen and is below the intermediate value in the predetermined voltage range, the energy management system 9 decreases the common charging rate for the storage batteries $11_2$ to $11_n$ (in more detail, current values that have been amended so as to decrease the calculated designated current values for the bidirectional DC/DC converters $14_2$ to $14_n$ that perform a CC operation are set as the final designated current values of the bidirectional DC/DC converters $14_2$ to $14_n$). By doing so, the power supplied from the DC bus 2 to the bidirectional DC/DC converters $14_2$ to $14_n$ that perform a CC operation is decreased, which suppresses the fall in the bus voltage Vbs. By operating in this way, the bus voltage Vbs is kept within the predetermined voltage range.

Also, with the DC power supplying system 1A, even when there is a sudden fluctuation in the bus voltage Vbs of the DC bus 2 (that is, a voltage fluctuation that cannot be completely reduced by control over the designated current value provided to the bidirectional DC/DC converters $14_2$ to $14_n$ that perform a CC operation), in a state where it is possible to charge the storage battery $11_1$ and discharge from the storage battery $11_1$, the sudden fluctuation in the bus voltage Vbs is reduced by the bidirectional DC/DC converter $14_1$ executing one of charging of the storage battery $11_1$ and discharging from the storage battery $11_1$ through a CV operation.

As described above, the DC power supplying system 1A is configured so that in cases when the DC power supplying system 1A is first started up and when the DC power supplying system 1A is restarted after an extended stoppage, the power generator 3a is operated for a certain period to supply the generated power W1 to the DC bus 2. This means that during the certain period, it is possible to supply the load voltages VLa and VLb with sufficient power from the DC bus 2 to the load appliances 71a and 71b and simultaneously sufficiently charge the storage batteries 11 included in the respective DC power supplies 6 (that is, charging until the charging voltage Vba becomes the upper limit value of the working voltage range (i.e., a fully charged state)). Here, by executing the cycle measurement process and the capacity calculation process, the energy management system 9, in the cycle T, calculates the present fully charged capacities Y of the storage batteries $11_2$ to $11_n$ and individually sets the designated current values for the bidirectional DC/DC converters $14_2$ to $14_n$ that perform a CC operation (designated current values calculated based on the present fully charged capacities Y and the charging rate) so that the storage batteries $11_2$ to $11_n$ are always charged with a common charging rate. This means that each of the storage batteries $11_2$ to $11_n$ is charged to the fully charged state in a state where the respective SOCs are the same. Accordingly, since the charging voltages Vba of the respective storage batteries $11_2$ to $11_n$ increase in a substantially uniform state, the storage batteries $11_2$ to $11_n$ reach the fully charged state at substantially the same timing.

Note that when the storage batteries 11 of the DC power supplies 6 have all been charged to the fully charged state before the certain period for which the power generator 3a operates has ended, by executing the power control process described above for the second converters 5, the energy management system 9 may produce a state likely to increase the total load power (WLa+WLb) and reallocate the power that was allocated to charging the storage batteries 11 to the load appliances 71. The energy management system 9 may also be provided with a display or the like that informs an operator present at the installed location of the power generator 3a that all of the storage batteries 11 have been charged to the fully charged state and urges the operator to stop the power generator 3a.

When the certain period ends, the power generator 3a is stopped. By doing so, after the end of the certain period, the DC power supplying system 1A switches to a normal operation state where only the power generator 3b automatically operates and generates power in keeping with the natural state.

In the DC power supplying system 1A operating in this normal operation state, the energy management system 9 executes the charging/discharging control process as described below while continuing to execute the cycle measurement process (that is, measurement of the number of cycles m for each storage battery 11), to execute the capacity calculation process (that is, calculation of the present fully charged capacity Y of each storage battery 11), and to execute the voltage measuring process (that is, measurement of the bus voltage Vbs).

First, during the charging/discharging control process in a natural state where the power generator 3$b$ is generating power (in the present embodiment, since the power generator 3$b$ is constructed of a solar power generator, during daytime), the energy management system 9 calculates the total generated power (here, only the generated power W2) and the total load power (WLa+WLb) every time new generated power W2 is acquired from the power conditioner 4$b$ of the power generator 3$b$ and/or new load power WLa and WLb is acquired from the DC/DC converters 5$a$ and 5$b$ of the load appliances 71$a$ and 71$b$.

Next, the energy management system 9 compares the calculated total generated power (W2) and the total load power (WLa+WLb) and when the total generated power (W2) exceeds the total load power (WLa+WLb) (as one example, when the insolation amount is high, so that the generated power W2 of the power generator 3$b$ is large), a power surplus is produced (that is, the power difference (=total generated power (W2)−total load power (WLa+WLb) will be positive), and therefore the energy management system 9 determines that charging of the storage batteries 11 of the respective DC power supplies 6 is possible.

Here, the energy management system 9 executes the charging/discharging control process with the same content as the charging/discharging control process described above when the power generator 3$a$ is operating. That is, the energy management system 9 performs control that preferentially has the bidirectional DC/DC converter 14$_1$ that performs a CV operation charge the storage battery 11$_1$ and controls the charging operation of the bidirectional DC/DC converters 14$_2$ to 14$_n$ by specifying designated current values that cause the bidirectional DC/DC converters 14$_2$ to 14$_n$ that perform a CC operation to always charge the corresponding storage batteries 11$_2$ to 11$_n$ with a common charging rate (that is, designated current values calculated based on the present fully charged capacities Y and the charging rate). By doing so, the storage batteries 11$_2$ to 11$_n$ are charged so as to have the same SOC, that is, so that the respective charging voltages Vba are the same. During execution of this charging/discharging control process, the energy management system 9 amends, based on the bus voltage Vbs measured in the voltage measuring process, the designated current values calculated in the cycle T for the bidirectional DC/DC converters 14$_2$ to 14$_n$ that perform a CC operation to produce the final designated current values, and thereby keeps the bus voltage Vbs in a predetermined voltage range.

Also, on determining, while detecting whether the charging voltage Vba included in the battery information outputted in the cycle T from the BMU 12 of a DC power supply 6 performing a charging operation has reached the upper limit value of the working voltage range (or that the SOC included in the battery information has reached 100%, that is, the storage battery 11 has reached the fully charged state), that the fully charged state has been reached, the energy management system 9 outputs contact control information indicating a cutoff instruction to the BMU 12 of the DC power supply 6 including that storage battery 11 in the fully charged state to set the contactor 13 in the cutoff state and thereby disconnect the storage battery 11 from the bidirectional DC/DC converter 14. By doing so, overcharging of the storage batteries 11 is prevented. Here, since the storage batteries 11$_2$ to 11$_n$ are charged so that the respective SOCs are the same as described above, the storage batteries 11$_2$ to 11$_n$ reach the fully charged state at substantially the same timing. This means that the storage batteries 11$_2$ to 11$_n$ are cut off from the corresponding bidirectional DC/DC converters 14$_2$ to 14$_n$ at substantially the same timing.

On the other hand, when as a result of comparing the total generated power (W2) and the total load power (WLa+WLb), the total generated power (W2) is below the total load power (WLa+WLb) (for example, when the insolation amount is low, so that the generated power W2 of the power generator 3$b$ is small), a power insufficiency is produced for the total load power (WLa+WLb) (that is, the power difference=generated power W2−total load power (WLa+WLb) is negative), the energy management system 9 determines that it is necessary to discharge from the storage batteries 11 of the DC power supplies 6. In this case, the energy management system 9 specifies the DC power supplies 6 with storage batteries 11 capable of being discharged based on the battery information acquired from the BMUs 12 of the respective DC power supplies 6, outputs contact control information indicating a connection instruction to the BMUs 12 of the specified DC power supplies 6, and outputs control information that indicates a discharging instruction to the bidirectional DC/DC converters 14 of these DC power supplies 6 (that is, the bidirectional DC/DC converters 14 are caused to execute a discharging operation).

In this DC power supplying system 1A, since the storage battery 11$_1$ is configured as described above so as to always be charged so that the charging voltage Vba is in the vicinity of the upper limit value of the working voltage range, the energy management system 9 always specifies the DC power supply 6$_1$ as a DC power supply 6 with a storage battery 11 that is capable of being discharged. When a DC power supply 6 out of the DC power supplies 6$_2$ to 6$_n$ corresponds to a DC power supply 6 with a storage battery 11 that is capable of discharging, the energy management system 9 specifies the DC power supply 6 in question as a DC power supply 6 with a storage battery 11 that is capable of being discharged. In the present embodiment, the storage batteries 11$_2$ to 11$_n$ are charged so as to have the same SOC, that is, so as to have the same charging voltage Vba. For this reason, the energy management system 9 specifies all of the DC power supplies 6$_2$ to 6$_n$ with the storage batteries 11$_2$ to 11$_n$ as DC power supplies 6 with storage batteries 11 that are capable of being discharged. Also, when the DC power supplies 6$_2$ to 6$_n$ are included in the specified DC power supplies 6, the energy management system 9 causes the DC power supplies 6$_2$ to 6$_n$ to perform a discharging operation with priority over the DC power supply 6$_1$. An example where the DC power supplies 6$_2$ to 6$_n$ are included in the specified DC power supplies 6 will now be described.

In this example, in order to cause the DC power supplies 6$_2$ to 6$_n$ to execute a discharging operation, the energy management system 9 first outputs contact control information indicating a connection instruction to the BMUs 12$_2$ to 12$_n$ of the DC power supplies 6$_2$ to 6$_n$ and outputs control information indicating a discharging instruction to the bidirectional DC/DC converters 14$_2$ to 14$_n$. Here, the energy management system 9 includes designated current values that individually set the current values of the current (the discharging current) to be discharged from the storage batteries 11$_2$ to 11$_n$ during the discharging operation (that is, current values that produce the common rate (or the "discharging rate") during discharging of the storage batteries 11$_2$ to 11$_n$) in the control information outputted to the bidirectional DC/DC converters 14$_2$ to 14$_n$ of the DC power supplies $6_2$ to $6_n$. By doing so, an amount of power corresponding to the power insufficiency described above is supplied from the DC power supplies $6_2$ to $6_n$ to the DC bus 2. Accordingly, the DC/DC converters 5a and 5b become capable of continuously supplying the load power WLa and WLb to the corresponding load appliances 71a and 71b.

The energy management system 9 calculates the individual designated current values for the bidirectional DC/DC converters $14_2$ to $14_n$ as follows.

First, the energy management system 9 calculates the power insufficiency for the total generated power (W2) (=total load power (WLa+WLb)-total generated power (W2), that is, the power difference) and divides this calculated power insufficiency by the measured bus voltage Vbs to calculate the current insufficiency for the entire DC power supplying system 1A (=power insufficiency/bus voltage Vbs).

Next, in the same way as when the charging rate Ra was calculated, the energy management system 9 divides the calculated current insufficiency by the sum of the present fully charged capacities Y of the storage batteries $11_2$ to $11_n$ to calculate the common discharging rate Rb per hour.

Finally, the energy management system 9 calculates the individual designated current values for the bidirectional DC/DC converters $14_2$ to $14_n$ in the cycle T based on this discharging rate Rb. In more detail, the energy management system 9 multiplies the present fully charged capacities Y of the storage batteries $11_2$ to $11_n$ corresponding to the bidirectional DC/DC converters $14_2$ to $14_n$ by the common discharging rate Rb to calculate the individual designated current values for the bidirectional DC/DC converters $14_2$ to $14_n$.

In this way, due to the energy management system 9 outputting contact control information indicating a connection instruction to the BMUs $12_2$ to $12_n$ of the DC power supplies $6_2$ to $6_n$ and also outputting control information indicating a discharging instruction to the bidirectional DC/DC converters $14_2$ to $14_n$ of the DC power supplies $6_2$ to $6_n$, at each DC power supply 6, the contactor 13 is placed in the connection state, so that the storage batteries $11_2$ to $11_n$ are connected via the contactors $13_2$ to $13_n$ in the connection state to the CC-type bidirectional DC/DC converters $14_2$ to $14_n$ that perform a discharging operation. As a result, constant current discharging of the storage batteries $11_2$ to $11_n$ is executed with the same discharging rate Rb.

When, as a result of the discharging operation described above being continuously executed in the DC power supplies $6_2$ to $6_n$, the charging voltage Vba of each of the storage batteries $11_2$ to $11_n$ has reached the lower limit value of the working voltage range and this has been detected based on the battery information acquired from the BMUs $12_2$ to $12_n$, the energy management system 9 outputs contact control information indicating a cutoff instruction to the BMUs $12_2$ to $12_n$ of the DC power supplies $6_2$ to $6_n$. When the discharging operation is being executed, the energy management system 9 individually sets the designated current values (that is, the designated current values calculated based on the present fully charged capacity Y and the discharging rate) for the bidirectional DC/DC converters $14_2$ to $14_n$ that perform a CC operation so that the discharging rate for the corresponding storage batteries $11_2$ to $11_n$ is always the same. This means that the storage batteries $11_2$ to $11_n$ are discharged in a state where their SOCs are uniform. During execution of the charging/discharging control process, the energy management system 9 amends, based on the DC bus voltage Vbs measured in the voltage measuring process, the designated current values calculated in the cycle T for the bidirectional DC/DC converters $14_2$ to $14_n$ that perform a CC operation to produce the final designated current values, and thereby keeps the bus voltage Vbs in the predetermined voltage range.

Accordingly, since the charging voltage Vba of each of the storage batteries $11_2$ to $11_n$ falls in a substantially uniform way and reaches the lower limit value of the working voltage range at substantially the same timing, the energy management system 9 outputs contact control information indicating a cutoff instruction at the same timing to the BMUs $12_2$ to $12_n$ of the DC power supplies $6_2$ to $6_n$. By doing so, at the DC power supplies $6_2$ to $6_n$, the BMUs $12_2$ to $12_n$ place the contactors $13_2$ to $13_n$ in the cut-off state at the same timing, so that the storage batteries $11_2$ to $11_n$ are cut off from the bidirectional DC/DC converters $14_2$ to $14_n$ at the same timing (that is, the discharging operations are stopped at the same timing). This means that overdischarging of the storage batteries $11_2$ to $11_n$ is prevented.

When the DC power supplies $6_2$ to $6_n$ have been caused to stop the discharging operation, the energy management system 9 then causes the DC power supply $6_1$ to execute a discharging operation. When doing so, the energy management system 9 outputs contact control information indicating a connection instruction to the BMU $12_1$ of the DC power supply $6_1$ and outputs control information indicating a discharging instruction to the bidirectional DC/DC converter $14_1$. At the DC power supply $6_1$, the BMU $12_1$ causes the contactor $13_1$ to shift to the connection state based on the contact control information indicating the connection instruction acquired from the energy management system 9 and thereby connects the storage battery $11_1$ to the bidirectional DC/DC converter $14_1$. The bidirectional DC/DC converter $14_1$ that is performing a discharging operation based on the control information indicating a discharging instruction acquired from the energy management system 9 steps up or steps down (that is, performs voltage conversion for) the charging voltage Vba of the storage battery $11_1$ and outputs to the DC bus 2 (that is, discharges the storage battery $11_1$).

Here, the energy management system 9 controls the time for which the DC power supply $6_1$ is caused to execute the discharging operation and controls the discharged power supplied from the DC power supplies 6 to the DC bus 2 so as to keep the bus voltage Vbs, which is being measured, in the predetermined voltage range described above.

If, as a result of the DC power supply $6_1$ continuously executing the discharging operation described above, the charging voltage Vba of the storage battery $11_1$ falls and reaches the voltage threshold set in the working voltage range, the energy management system 9 detects this based on the battery information acquired from the BMU $12_1$ and outputs contact control information indicating a cutoff instruction to the BMU $12_1$ of the DC power supply $6_1$. By doing so, at the DC power supply $6_1$, the contactor $13_1$ will be caused by the BMU $12_1$ to shift to the cutoff state, which disconnects the storage battery $11_1$ from the bidirectional DC/DC converter $14_1$ (that is, the discharging operation is stopped). This means that a situation where the charging voltage Vba of the storage battery $11_1$ falls below the voltage threshold is prevented, and it is possible for the DC/DC converter 7 to generate and output the operating voltage Vop for a sufficiently long period based on the charging voltage Vba of the storage battery $11_1$.

By doing so, the supplying of power from all of the DC power supplies 6 to the DC bus 2 is stopped. In the DC power supplying system 1A, if, in a state where the total generated power (W2) is below the total load power (WLa+

WLb), the DC/DC converters 5a and 5b were to continue the operation described above, there is the risk that the bus voltage Vbs would fall and drop below the lower limit voltage (DC 340V) of the predetermined voltage range (in the present embodiment, the range of DC 340V to DC 400V, inclusive). For this reason, to keep the bus voltage Vbs being measured in the predetermined voltage range (in the present embodiment, the range of DC 340V to DC 400V, inclusive) described above, the energy management system 9 executes the power control process that changes the upper limit current value set for the second converters 5 (in the present embodiment, at least one out of the DC/DC converters 5a and 5b) to reduce the total load power (WLa+WLb) (or increase the total load power (WLa+WLb) when the generated power W2 has increased).

Next, the charging/discharging control process in a natural state where the power generator 3b is not generating power (or "generation stopped state") (in the present embodiment, since the power generator 3b is constructed of a solar power generator, night-time) will be described.

In the charging/discharging control process, since the total generated power (W2) is substantially zero, the energy management system 9 executes the same operation as when the total generated power (W2) falls below the total load power (WLa+WLb) described above. Accordingly, the energy management system 9 first detects whether there are any DC power supplies 6 with dischargeable storage batteries 11 based on the battery information acquired from the BMUs 12 of the respective DC power supplies 6 and when such a DC power supply 6 exist, specifies and causes the DC power supply 6 to perform a discharging operation to produce a state where it is possible for the DC/DC converters 5a and 5b to generate the load voltages VLa and VLb for the corresponding load appliances 71a and 71b.

After this, the DC power supplies $6_2$ to $6_n$ (when the charging voltages Vba of the storage batteries $11_2$ to $11_n$ have reached the lower limit value of their working voltage ranges (in this case, the charging voltages Vba of the storage batteries $11_2$ to $11_n$ reach the lower limit value of the working voltage range at substantially the same timing)) and/or the DC power supply $6_1$ (when the charging voltage Vba of the storage battery $11_1$ has reached the voltage threshold) set(s) the respective contactors 13 in the cutoff state based on contact control information indicating a cutoff instruction from the energy management system 9 to stop the discharging operation. Here, since no device is supplying power to the DC bus 2, the energy management system 9 outputs control information indicating a stopping instruction to the bidirectional DC/DC converters 14 of all of the DC power supplies 6 to stop the operations of the bidirectional DC/DC converters 14, thereby placing the DC power supplying system 1A in the sleep state (that is, a state with the lowest consumption inside the DC power supplying system 1A of the charged power of the storage batteries 11). Also, since the DC power supplying system 1A is configured so that the charging voltages Vba of the storage batteries $11_2$ to $11_n$ reach the lower limit value of the working voltage range at substantially the same timing as described above and enter the sleep state, it is possible to keep the SOCs of the storage batteries $11_2$ to $11_n$ uniform in the sleep state.

Note that the DC power supplying system 1A of the present embodiment uses a configuration where in all of the DC power supplies 6, the contactors 13 are disposed between the storage batteries 11 and the bidirectional DC/DC converters 14, and when there is no device supplying power to the DC bus 2 as described above, all of the contactors 13 are placed in the cutoff state to cut off (disconnect) the storage batteries 11 and the bidirectional DC/DC converters 14. This means that with the DC power supplying system 1A according to the present embodiment, the sleep state described above is effectively entered at the point where all of the contactors 13 are placed in the cutoff state, without going as far as the operation of the bidirectional DC/DC converters 14 being stopped. However, a DC power supply configured without the contactors 13 is also conceivable (that is, a DC power supply configured with the storage batteries 11 directly connected to the bidirectional DC/DC converters 14), and in a DC power supplying system equipped with the DC power supply of this configuration, the sleep state is entered by stopping the operations of the bidirectional DC/DC converters 14.

After the sleep state is entered, in the DC power supplying system 1A, since the storage battery $11_1$ and the bidirectional DC/DC converter $14_1$ become cut off (disconnected) at the contactor $13_1$, or in a DC power supplying system including the DC power supply described above configured without the contactors 13, since the bidirectional DC/DC converter $14_1$ connected to the storage battery $11_1$ is stopped, the charged power of the storage battery $11_1$ is supplied only to the DC/DC converter 7 that generates and outputs the operating voltage Vop.

Accordingly, in a DC power supplying system (including the DC power supplying system 1A) capable of entering the sleep state in this way, the conversion efficiency from the charging voltage Vba to the operating voltage Vop at the DC/DC converter 7 is favorable, and when the power consumption at the BMU 12 and contactor 13 of each DC power supply 6 that is supplied with the operating voltage Vop and kept in an operating state and at the energy management system 9 is low, it is possible to sufficiently extend the time taken for the charging voltage Vba to fall from the voltage threshold to the lower limit value of the working voltage range due to the charged power of the storage battery $11_1$ being consumed (that is, to extend the operating time of the BMUs 12, the contactors 13, and the energy management system 9). By doing so, in a DC power supplying system (including the DC power supplying system 1A), since it is possible to keep the BMU 12 and the contactor 13 of each DC power supply 6 and the energy management system 9 in the operating state until the generation of power by the power generator 3b restarts, at the restart of power generation by the power generator 3b, the energy management system 9 and the like will operate as described above and enable charging operations of the respective storage batteries 11 and a supplying operation for the load voltages VLa and VLb to the load appliances 71a and 71b.

The energy management system 9 compares the total generated power (W2) and the total load power (WLa+WLb) and when the total generated power (W2) matches the total load power (WLa+WLb), determines that charging of the storage batteries 11 of the respective DC power supplies 6 is not possible and that discharging from the storage batteries 11 of the respective DC power supplies 6 is unnecessary, and therefore does not execute charging or discharging of the storage batteries 11 of the DC power supplies 6.

In this way, the DC power supplying system 1A is equipped with the bidirectional DC/DC converters $14_2$ to $14_n$ that perform a CC (constant current) operation as bidirectional DC/DC converters for charging and discharging the storage batteries $11_2$ to $11_n$ that mainly function as the storage batteries 11 that supply power to the DC bus 2, with the energy management system 9 individually setting the designated current values for these bidirectional DC/DC converters $14_2$ to $14_n$ so that the charging rates are the same and the discharging rates are the same respectively during charging and discharging of the storage batteries $11_2$ to $11_n$.

Accordingly, with the DC power supplying system 1A, since it is possible to charge and discharge the storage batteries $11_2$ to $11_n$ so that the respective SOCs are always uniform (that is, so that the fully charged state is reached at substantially the same timing and the lower limit value of the working voltage range is reached at substantially the same timing), even when charging and discharging are repeated for the storage batteries $11_2$ to $11_n$, it is possible to avoid a situation where a difference is produced in the number of cycles m between the storage batteries $11_2$ to $11_n$, and as a result, it is possible to significantly reduce the occurrence of fluctuations in the battery life between the storage batteries $11_2$ to $11_n$.

Also, in this DC power supplying system 1A, while executing the capacity calculation process that calculates the present fully charged capacities Y of the plurality of storage batteries $11_2$ to $11_n$, the energy management system 9 calculates, when charging the storage batteries $11_2$ to $11_n$, designated current values for the charging currents (the constant DC currents) that the bidirectional DC/DC converters $14_2$ to $14_n$ are to supply to the storage batteries $11_2$ to $11_n$ based on the calculated present fully charged capacities Y and the common charging rate, and calculates, when discharging the storage batteries $11_2$ to $11_n$, designated current values for the discharging currents (the constant DC currents) that the bidirectional DC/DC converters $14_2$ to $14_n$ are to supply from the storage batteries $11_2$ to $11_n$ to the DC bus 2 based on the calculated present fully charged capacities Y and the common discharging rate.

This means that according to the DC power supplying system 1A, even when the fully charged capacities Y of the storage batteries $11_2$ to $11_n$ have changed in keeping with an increase in the number of cycles m, it is possible to designate, to the bidirectional DC/DC converters $14_2$ to $14_n$, when the storage batteries $11_2$ to $11_n$ are to be charged, designated current values that produce the common charging rate for the storage batteries $11_2$ to $11_n$, and to designate, to the bidirectional DC/DC converters $14_2$ to $14_n$, when the storage batteries $11_2$ to $11_n$ are to be discharged, designated current values that produce the common discharging rate for the storage batteries $11_2$ to $11_n$. This means that according to this DC power supplying system 1A, even when the fully charged capacities Y of the storage batteries $11_2$ to $11_1$ have changed in this way, it is possible to charge and discharge the storage batteries $11_2$ to $11_n$ in a state where their respective SOCs are always uniform, so that it is possible to more reliably avoid a situation where a difference is produced in the number of cycles m between the storage batteries $11_2$ to $11_n$, and possible to significantly reduce the occurrence of fluctuations in the battery life of the storage batteries $11_2$ to $11_n$.

According to the DC power supplying system 1A, while executing the cycle measurement process that measures the present number of cycles m of the plurality of storage batteries $11_2$ to $11_n$, the energy management system 9 calculates, in the capacity calculation process, the present fully charged capacity Y based on the present number of cycles m (in more detail, the number of cycles m, the specification-based battery capacity Wsp of the storage battery 11, and the rate of fall α). This means that it is possible to accurately calculate the fully charged capacities Y, which means that it is possible to more accurately calculate the designated current values that are designated to the respective bidirectional DC/DC converters $14_2$ to $14_n$ (that is, designated current values that produce the common charging rate for the storage batteries $11_2$ to $11_n$ and designated current values that produce the common discharging rate for the storage batteries $11_2$ to $11_n$). Accordingly, it is possible to more accurately perform charging and discharging of the storage batteries $11_2$ to $11_n$ in state where the respective SOCs are always uniform and as a result, it is possible to further reduce the occurrence of fluctuations in the battery life of the storage batteries $11_2$ to $11_n$.

The DC power supplying system 1A also includes the storage battery $11_1$ and the bidirectional DC/DC converter $14_1$ that is connected between the storage battery $11_1$ and the DC bus 2 and performs a CV (constant voltage) operation as a bidirectional DC/DC converter for charging and discharging the storage battery $11_1$. According to the DC power supplying system 1A, even when there is a sudden fluctuation in the bus voltage Vbs of the DC bus 2 (that is, a fluctuation that cannot be completely reduced by control over the bidirectional DC/DC converters $14_2$ to $14_n$ that perform a CC operation), in a state where it is possible to charge the storage battery $11_1$ and discharge from the storage battery $11_1$, the sudden fluctuation in the bus voltage Vbs can be reduced by the bidirectional DC/DC converter $14_1$ executing one of charging of the storage battery $11_1$ and discharging from the storage battery $11_1$ through a CV operation.

Note that although the DC power supplying system 1A described above is configured so that one DC power supply $6_1$ out of the plurality of DC power supplies $6_1$ to $6_n$ includes the bidirectional DC/DC converter $14_1$ that performs a CV operation and the remaining DC power supplies $6_2$ to $6_n$ include the bidirectional DC/DC converters $14_2$ to $14_n$ that perform a CC operation, the present invention is not limited to this configuration. As one example, like the DC power supplying system 1B depicted in FIG. 2, it is also possible to use a configuration where every one of the plurality of DC power supplies 6 includes a bidirectional DC/DC converter 14 that performs a CC operation and a capacitor 21 is connected to the DC bus 2 as a means for reducing sudden fluctuations produced in the bus voltage Vbs.

The DC power supplying system 1B will now be described. Configurations that are the same as the DC power supplying system 1A have been assigned the same reference numerals, duplicated description is omitted, and the description will instead focus on differences. Also, for ease of understanding, the DC power supplying system 1B uses a configuration that omits the DC power supply $6_1$ included in the DC power supplying system 1A and in which all of the disposed DC power supplies 6 (the DC power supplies $6_2$ to $6_n$) are bidirectional DC/DC converters 14 that perform a CC operation.

First, the configuration of the DC power supplying system 1B as a DC power supplying system will be described.

Figure 2:
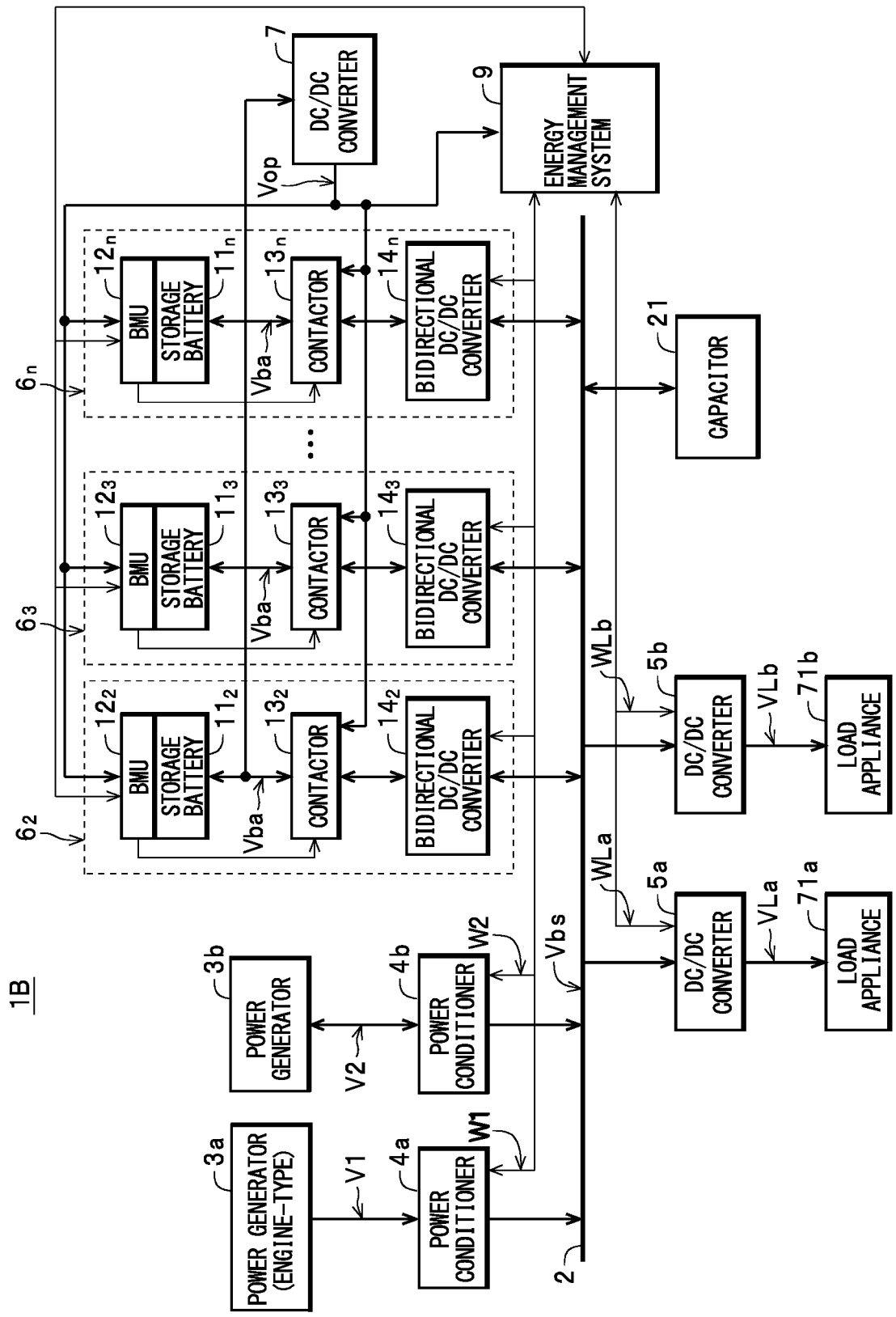
FIG. 2 is a diagram depicting the configuration of another DC power supplying system 1B.

As depicted in FIG. 2, the DC power supplying system 1B includes the DC bus 2, one or two or more power generators 3 (as one example in the present embodiment, two power generators 3a and 3b), two power conditioners 4a and 4b as the first converters 4 disposed corresponding to the power generators 3, two second converters 5a and 5b as the second converters 5 disposed corresponding to the load appliances 71 (as one example in the present embodiment, the two load appliances 71a and 71b) connected to the DC power supplying system 1B, the plurality of DC power supplies (DC power supplies $6_2$, $6_3$, . . . , $6_n$), the third converter 7, the energy management system 9, and the capacitor 21. The DC power supplying system 1B is configured as a standalone DC power supplying system capable of generating a DC voltage based on power generated by the power generators 3 and supplying the DC voltage to the load appliances 71a and 71b.

The (n−1) DC power supplies $6_2, 6_3, \ldots, 6_n$ are disposed as the DC power supplies 6. The respective DC power supplies $6_2$ to $6_n$ include the storage batteries $11_2$ to $11_n$, the BMUs $12_2$ to $12_n$, the contactors $13_2$ to $13_n$, and the bidirectional DC/DC converters $14_2$ to $14_n$.

The DC power supply $6_2$ is configured in the same way as the DC power supply $6_1$ in the DC power supplying system 1A described above, but with the storage battery $11_2$ connected to the third converter 7. By doing so, the (single) storage battery $11_2$ is also used to supply power to the DC bus 2, but mainly functions as a storage battery for supplying power (the operating voltage Vop) for the BMUs 12 and the contactors 13 of the DC power supplies $6_2$ to $6_n$ and also the energy management system 9. This means that in operating states aside from the sleep state and a state where the contactor $13_2$ has been cut off from the corresponding storage battery $11_2$, the storage battery $11_2$ is subjected to charging and discharging control by the energy management system 9 so that the charging voltage Vba is equal to above a voltage threshold, which is set in advance so as to be below the upper limit value of the working voltage range of the storage battery $11_2$ and above the lower limit value of the working voltage range of the storage battery $11_2$. Since this means that the storage battery $11_2$ typically has a higher number of charging/discharging cycles than the other storage batteries $11_3$ to $11_n$, the storage battery $11_2$ is composed of a high-cost storage battery (as examples, a lithium ion battery or a NaS battery (sodium sulfur battery)) that hardly deteriorates even when the number of charging/discharging cycles is high (that is, has a working life that is barely affected by the number of charging/discharging cycles). Note that although it is preferable to suppress the number of high-cost storage batteries as in the present embodiment to the minimum number (that is, the storage battery $11_2$ alone) to suppress rises in the device cost of the DC power supplying system 1B, it is also possible to increase the number within a permitted range.

On the other hand, the storage batteries $11_3$ to $11_n$ aside from the storage battery $11_2$ are mainly used to supply power to the DC bus 2 and are numerous. For this reason, the storage batteries $11_3$ to $11_n$ are typically large-capacity and low-cost storage batteries, such as lead acid storage batteries or nickel-metal hydride batteries, and are configured as storage batteries of the same type and the same capacity.

When the control information received from the energy management system 9 is a charging instruction, the bidirectional DC/DC converters $14_2$ to $14_n$ step up or step down (that is, perform voltage conversion for) the bus voltage Vbs inputted from the second pair of input/output terminals and output from the first pair of input/output terminals to the storage batteries 11 to supply a charging current to the storage batteries 11 with a designated current value included in the control information and thereby charge the storage batteries 11 (that is, to execute a charging operation with a constant current). Also, when the received control information is a discharging instruction, by stepping up or stepping down (that is, performing voltage conversion for) the charging voltage Vba of the storage batteries 11 inputted from the first pair of input/output terminals and outputting from the second pair of input/output terminals to the DC bus 2, the bidirectional DC/DC converters $14_2$ to $14_n$ output a discharging current with a designated current value included in the control information from the storage batteries 11 (that is, the storage batteries 11 are discharged (the bidirectional DC/DC converters $14_2$ to $14_n$ execute a discharging operation with the constant current)).

The capacitor 21 is directly connected to the DC bus 2. By this configuration, the capacitor 21 is always charged with the bus voltage Vbs.

The operation of the DC power supplying system 1B depicted in FIG. 2 will now be described. Note that description of operations that are the same as the operations of the DC power supplying system 1A has been omitted and the description will instead focus on the different operations, that is, the operation of the DC power supply $6_2$ and the operation of the capacitor 21. It is assumed that the storage batteries $11_3$ to $11_n$ are in a state where their respective SOCs are uniform.

First, the operation of the various components in the certain period where the power generator 3a is operating will be described.

In the charging/discharging control process during operation of the power generator 3a, since the total generated power (W1+W2) will be equal to or higher than the standard power, the energy management system 9 executes control over the DC/DC converters 5a and 5b to convert and output the bus voltage Vbs to become the load voltages VLa and VLb used by the corresponding load appliances 71a and 71b. Due to this, the load appliances 71a and 71b operate.

Also, since the total generated power (W1+W2) exceeds the total load power (WLa+WLb), the energy management system 9 executes charging of the storage batteries 11 of the DC power supplies 6 using the power surplus (the power difference=total generated power (W1+W2)-total load power (WLa+WLb)). Here, the energy management system 9 includes the designated current values for the charging current to be supplied to the storage batteries $11_2$ to $11_n$ during a charging operation in the control information and outputs to the bidirectional DC/DC converters $14_2$ to $14_n$ that perform a CC operation in the DC power supplies $6_2$ to $6_n$.

The energy management system 9 calculates these designated current values as follows. First, the energy management system 9 calculates the surplus current for the entire DC power supplying system 1B by dividing the power surplus by the measured bus voltage Vbs. Next, the energy management system 9 sets a surplus current (or the "specified surplus current") that is a predetermined proportion out of the calculated entire surplus current to be used for charging the storage battery $11_2$, and based on the specified surplus current, the designated current value for the corresponding bidirectional DC/DC converter $14_2$ (that is, the current value of the charging current in cycle T) is calculated. In this way, the storage battery $11_2$ is always charged with a current value calculated from the specified surplus current regardless of the states of the other storage batteries $11_3$ to $11_n$, so that the storage battery $11_2$ is charged with priority over the other storage batteries $11_3$ to $11_n$.

In addition, the energy management system 9 sets the remaining surplus current obtained by subtracting the specified surplus current from the entire calculated surplus current to be used for charging the storage batteries $11_3$ to $11_n$. Based on this remaining surplus current and the sum of the present fully charged capacities Y of the storage batteries $11_3$ to $11_n$, the designated current values (that is, the designated current values for the corresponding bidirectional DC/DC converters $14_3$ to $14_n$) are individually calculated so that in the same way as in the DC power supplying system 1A, the charging rate of the charging current for the storage batteries $11_3$ to $11_n$ is the same. Since the storage batteries $11_3$ to $11_n$ are charged with the common charging rate, the storage batteries $11_3$ to $11_n$ are charged in a state where their respective SOCs are uniform, that is, in a state where the charging voltages Vba are uniform.

Also, the energy management system 9 detects whether the charging voltage Vba included in the battery information outputted in the cycle T from the BMU 12 of each DC power supply 6 has reached the upper limit value of the working voltage range (or whether the SOC has reached 100%, that is, whether the storage battery 11 has reached a fully charged state). On determining a fully charged state, the energy management system 9 outputs contact control information indicating a cutoff instruction to the BMU 12 of the DC power supply 6 including the storage battery 11 in question to place the contactor 13 in a cutoff state and thereby disconnect the storage battery 11 from the bidirectional DC/DC converter 14. By doing so, overcharging of the storage batteries 11 is prevented.

By operating as described above, the storage battery $11_2$ that is preferentially charged reaches the fully charged state first (that is, charging is completed). Here, when charging the storage batteries $11_3$ to $11_n$ in each cycle T after the charging of the storage battery $11_2$ has been completed, the energy management system 9 executes the charging/discharging control process that continues charging of the storage batteries $11_3$ to $11_n$ by individually calculating, with the surplus current of the DC power supplying system 1B as a whole as the remaining surplus current described above, designated current values that produce the common charging rate of the charging currents for the storage batteries $11_3$ to $11_n$ and including the designated current values in the control information to be sent to the corresponding bidirectional DC/DC converters $14_3$ to $14_n$. Accordingly, the storage batteries $11_3$ to $11_n$ are charged so that their respective SOCs are uniform, that is, so that the charging voltages Vba are uniform, even after the storage battery $11_2$ has been fully charged.

Since the storage batteries $11_3$ to $11_n$ are charged in a state where their respective SOCs are uniform as described above, the storage batteries $11_3$ to $11_n$ will reach the fully charged state at substantially the same timing.

Next, the operation when the power generator 3a is stopped and the power generator 3b is generating power (during daytime) will be described.

In the charging/discharging control process in this case, when the total generated power (W2) exceeds the total load power (WLa+WLb), the energy management system 9 determines that it is possible to charge the storage batteries 11 of the respective DC power supplies 6 and executes the charging/discharging control process with the same content as the charging/discharging control process when the power generator 3a is operating as described above.

As a result, the storage battery $11_2$ is charged with priority over the other storage batteries $11_3$ to $11_n$. Also, the storage batteries $11_3$ to $11_n$ are charged in a state where their SOCs are uniform.

On the other hand, when the total generated power (W2) is below the total load power (WLa+WLb) and a power insufficiency is produced for the total load power (WLa+WLb), the energy management system 9 executes discharging from the storage batteries 11 of the DC power supplies 6. In this case, the energy management system 9 includes designated current values for the discharging currents to be discharged from the storage batteries $11_2$ to $11_n$ during a discharging operation in the control information and outputs to the CC-type bidirectional DC/DC converters $14_2$ to $14_n$ in the DC power supplies $6_2$ to $6_n$.

Here, in the DC power supplying system 1B, to cause the DC power supplies $6_3$ to $6_n$ to execute a discharging operation, the energy management system 9 first outputs contact control information indicating a connection instruction to the BMUs $12_3$ to $12_n$ of the DC power supplies $6_3$ to $6_n$ and outputs control information indicating a discharging instruction to the bidirectional DC/DC converters $14_3$ to $14_n$. The energy management system 9 also individually calculates and includes designated current values that produce the common discharging rate for the discharging currents from the storage batteries $11_3$ to $11_n$ in the control information and outputs to the bidirectional DC/DC converters $14_3$ to $14_n$. By doing so, an amount of power corresponding to the power insufficiency described above is supplied from the DC power supplies $6_3$ to $6_n$ to the DC bus 2. Accordingly, the DC/DC converters 5a and 5b become capable of continuously supplying the load power WLa and WLb to the corresponding load appliances 71a and 71b.

To calculate these designated current values, the energy management system 9 calculates the current insufficiency for the entire DC power supplying system 1B by dividing the power insufficiency (=total load power (WLa+WLb)—total generated power (W2), that is, the power difference) by the bus voltage Vbs, and individually calculates, based on the current insufficiency and the sum of the fully charged capacities of the bidirectional DC/DC converters $14_3$ to $14_n$, designated current values (that is, the designated current values for the corresponding bidirectional DC/DC converters $14_3$ to $14_n$) that produce the common discharging rate for the discharging currents from the storage batteries $11_3$ to $11_n$ in the same way as in the DC power supplying system 1A.

The energy management system 9 detects whether the charging voltage Vba included in the battery information outputted in the cycle T from the BMUs 12 of the DC power supplies 6 has reached a lower limit value of a working voltage range, and when it has been detected that the charging voltage Vba has reached this lower limit value, outputs contact control information indicating a cutoff instruction to the BMUs 12 of the DC power supplies 6 that include these storage batteries 11 and places the contactors 13 in a cutoff state to cut off the storage batteries 11 from the bidirectional DC/DC converters 14. By doing so, overdischarging of the storage batteries 11 is prevented. In this case, the energy management system 9 controls the bidirectional DC/DC converters $14_3$ to $14_n$ that perform a CC operation to perform discharging operations with the individual designated current values calculated as described above. Since the storage batteries $11_3$ to $11_n$ are discharged with a common discharging rate, the storage batteries $11_3$ to $11_n$ are discharged in a state where their respective SOCs are uniform, that is, in a state where the charging voltage Vba is uniform.

When discharging operations by the DC power supplies $6_3$ to $6_n$ have been stopped, the energy management system 9 then has the DC power supply $6_2$ execute a discharging operation. When as a result of the DC power supply $6_2$ continuously executing the discharging operation, the energy management system 9 detects, based on the battery information acquired from the BMU $12_2$ that the charging voltage Vba of the storage battery $11_2$ has dropped and reached a set voltage threshold in the working voltage range, the energy management system 9 sets the contactor $13_2$ in the cutoff state to disconnect the storage battery $11_2$ from the bidirectional DC/DC converter $14_2$, thereby preventing a situation where the charging voltage Vba of the storage battery $11_2$ falls below the voltage threshold.

In the DC power supplying system 1B, even when there is a sudden fluctuation in the bus voltage Vbs of the DC bus 2 (that is, a voltage fluctuation that cannot be completely reduced by control over the designated current values provided to the bidirectional DC/DC converters $14_2$ to $14_n$ that perform a CC operation), the capacitor 21 connected to the DC bus 2 reduces the sudden fluctuation.

Next, the charging/discharging control process in a natural state where the power generator 3b is not generating power (or "generation stopped state") (in the present embodiment, since the power generator 3b is constructed of a solar power generator, night-time) will be described.

In the charging/discharging control process, since the total generated power (W2) is substantially zero, the energy management system 9 executes the same operation as when the total generated power (W2) described above falls below the total load power (WLa+WLb) to cause specified DC power supplies 6 to perform a discharging operation and produce a state where it is possible for the DC/DC converters 5a and 5b to generate the load voltages VLa and VLb for the corresponding load appliances 71a and 71b.

After this, the DC power supplies $6_3$ to $6_n$, when the charging voltage Vba of the storage batteries $11_3$ to $11_n$ has reached the lower limit value of the working voltage range, or the DC power supply $6_2$, when the charging voltage Vba of the storage battery $11_2$ has reached the voltage threshold, place(s) the contactor(s) 13 in the cutoff state based on contact control information indicating a cutoff instruction from the energy management system 9 and thereby stop(s) the discharging operation. Here, since there is no device supplying power to the DC bus 2, in the same way as the operation of the DC power supplying system 1A, the energy management system 9 places the DC power supplying system 1B in a sleep state.

This DC power supplying system 1B also includes the bidirectional DC/DC converters $14_3$ to $14_n$ that perform a CC operation as the bidirectional DC/DC converters for charging and discharging the storage batteries $11_3$ to $11_n$ that function as storage batteries 11 that mainly supply power to the DC bus 2, with the energy management system 9 causing the bidirectional DC/DC converters $14_3$ to $14_n$ to charge and discharge the corresponding storage batteries $11_3$ to $11_n$ with a common designated current value.

During execution of the charging/discharging control process described above, the energy management system 9 amends, based on the bus voltage Vbs measured by the voltage measuring process, the designated current values calculated for the bidirectional DC/DC converters $14_2$ to $14_n$ that perform a CC operation and thereby produces the final designated current values (that is, the designated current values to be included in the control information actually sent to the bidirectional DC/DC converters $14_2$ to $14_n$). That is, by controlling the designated current values sent to the bidirectional DC/DC converters $14_2$ to $14_n$, the bus voltage Vbs is kept in the predetermined voltage range.

In this way, the DC power supplying system 1B is also equipped with bidirectional DC/DC converters $14_3$ to $14_n$ that perform a CC (constant current) operation as bidirectional DC/DC converters for charging and discharging the storage batteries $11_3$ to $11_n$ that mainly function as the storage batteries 11 that supply power to the DC bus 2, with the energy management system 9 individually setting the designated current values for the bidirectional DC/DC converters $14_3$ to $14_n$ so that the charging rates are the same and discharging rates are the same respectively during charging and discharging of the storage batteries $11_3$ to $11_n$.

Accordingly, with the DC power supplying system 1B also, since it is possible to charge and discharge the storage batteries $11_3$ to $11_n$ so that the respective SOCs are always uniform (that is, so that the storage batteries $11_3$ to $11_n$ can reach the fully charged state at substantially the same timing and reach the lower limit value of the working voltage range at substantially the same timing), even when charging and discharging of the storage batteries $11_3$ to $11_n$ are repeated, it is possible to avoid a situation where a difference is produced in the number of cycles m between the storage batteries $11_2$ to $11_n$, and as a result, it is possible to significantly reduce the occurrence of fluctuations in the battery life between the storage batteries $11_3$ to $11_n$.

Also with the DC power supplying system 1B, while executing the capacity calculation process that calculates the present fully charged capacities Y of the plurality of storage batteries $11_3$ to $11_n$, the energy management system 9 calculates, when charging the storage batteries $11_3$ to $11_n$, designated current values for the charging currents (the constant DC currents) that the bidirectional DC/DC converters $14_3$ to $14_n$ are to supply to the storage batteries $11_3$ to $11_n$ based on these present fully charged capacities Y, and calculates, when discharging the storage batteries $11_3$ to $11_n$, designated current values of the discharging currents (the constant DC currents) that the bidirectional DC/DC converters $14_3$ to $14_n$ are to supply from the storage batteries $11_3$ to $11_n$ to the DC bus 2. This means that even when the fully charged capacities Y of the storage batteries $11_3$ to $11_n$ change, it is still possible to charge and discharge the storage batteries $11_3$ to $11_n$ in a state where their respective SOCs are always uniform, so that it is possible to more reliably avoid a situation where a difference is produced in the number of cycles m between the storage batteries $11_3$ to $11_n$, and possible to significantly reduce the occurrence of fluctuations in the battery life of the storage batteries $11_3$ to $11_n$.

With the DC power supplying system 1B also, while executing the cycle measurement process that measures the present number of cycles m of the plurality of storage batteries $11_3$ to $11_n$, the energy management system 9 calculates the present fully charged capacities Y of the storage batteries $11_3$ to $11_n$ based on this number of cycles m, the specification-based battery capacities Wsp of the storage batteries $11_3$ to $11_n$, and the rate of fall α. This means that it is possible to accurately calculate the fully charged capacities Y, which means that it is possible to more accurately calculate the designated current values that are designated to the respective bidirectional DC/DC converters $14_3$ to $14_n$ (that is, designated current values that produce the common charging rate for the storage batteries $11_3$ to $11_n$ and designated current values that produce the common discharging rate for the storage batteries $11_3$ to $11_n$). Accordingly, it is possible to more accurately perform charging and discharging of the storage batteries $11_3$ to $11_n$ in state where the respective SOCs are always uniform, and as a result, it is possible to further reduce the occurrence of fluctuations in the battery life of the storage batteries $11_3$ to $11_n$.

Also, according to the DC power supplying system 1B, since the capacitor 21 is connected to the DC bus 2, even when there is a sudden fluctuation in the bus voltage Vbs of the DC bus 2 (that is, a voltage fluctuation that cannot be completely reduced by control over the bidirectional DC/DC converters $14_2$ to $14_n$ that perform a CC operation), since the power charged in the capacitor 21 is discharged to the DC bus 2, it is possible to reduce the sudden fluctuation in the bus voltage Vbs.

The DC power supplying systems 1A and 1B described above use a favorable configuration where while executing the capacity calculation process that calculates the present fully charged capacities Y of a plurality of storage batteries 11, the energy management system 9 calculates the designated current values for the charging currents (the constant DC currents) that the bidirectional DC/DC converters 14 are to supply to the corresponding storage batteries 11 based on the calculated present fully charged capacities Y and the common charging rate, and calculates the designated current values for the discharging currents (the constant DC currents) that the bidirectional DC/DC converters 14 are to supply from the corresponding storage batteries 11 to the DC bus 2 based on the calculated present fully charged capacities Y and the common discharging rate. However, as another example, when storage batteries for which there is little change in the fully charged capacity Y (that is, storage batteries where the actual fully charged capacity Y hardly changes from the initial battery capacity (the specification-based battery capacity Wsp) are used as the plurality of storage batteries 11, it is also possible to use a simplified configuration where the designated current values for the charging currents (the constant DC currents) that the bidirectional DC/DC converters 14 are to supply to the corresponding storage batteries 11 are calculated based on the specification-based battery capacities Wsp and the common charging rate and the designated current values for the discharging currents (the constant DC currents) that the bidirectional DC/DC converters 14 are to supply from the corresponding storage batteries 11 to the DC bus 2 are calculated based on the specification-based battery capacities Wsp and the common discharging rate. By using this configuration, it is possible to omit the cycle measurement process and the capacity calculation process described above, which makes it possible to reduce the load of the energy management system 9.

Although the DC power supplying systems 1A and 1B described above use a configuration equipped with the DC/DC converter 7 that operates based on charged power of the storage battery $11_1$ or the storage battery $11_2$ and supplies the operating voltage Vop to the BMUs 12, the contactors 13, and the energy management system 9, the present invention is not limited to this. As one example, if the system configuration is capable of sufficiently maintaining the bus voltage Vbs of the DC bus 2 in a predetermined voltage range using the DC power supplies 6 (in more detail, a configuration where the capacities of the storage batteries 11 are sufficiently large so that the charging voltage Vba will not rise above the lower limit value of the working voltage range) during a period from the generation of power by the power generator 3b stopping until the generation of power restarts, it is also possible to use a configuration where each BMU 12 and contactor 13 operate on the charging voltage Vba of the corresponding storage battery 11, the energy management system 9 operates on the charging voltage Vba of at least one storage battery 11 out of the storage batteries 11, and the DC/DC converter 7 is omitted.

INDUSTRIAL APPLICABILITY

According to the present invention, since it is possible to delay deterioration in storage batteries due to differences being produced in the number of charging and discharging cycles between the storage batteries, the present invention can be widely applied in standalone DC power supplying systems that require storage batteries.

REFERENCE SIGNS LIST 1A, 1B DC power supplying system
2 DC bus
3a, 3b Power generator
4a, 4b First converter
5a, 5b Second converter
9 Energy management system
$11_2$ to $11_n$ Storage battery
$14_2$ to $14_n$ Bidirectional DC/DC converter
71a, 71b Load appliance
W1, W2 Generated power
W1a, W1b Load power

The invention claimed is:

1. A standalone direct current (DC) power supplying system that is not connected to commercial power, comprising:
   a DC bus that serves as a bus line of a DC power supply;
   a power generator;
   a first converter that supplies generated power generated by the power generator to the DC bus;
   a second converter that performs voltage conversion on a DC voltage supplied to the DC bus and supplies to a load appliance;
   a plurality of first storage batteries whose fully charged capacities differ;
   a plurality of constant current-type first bidirectional converters that are each connected between one of the plurality of first storage batteries and the DC bus, each bidirectionally perform voltage conversion between the DC voltage supplied to the DC bus and a DC voltage for the corresponding first storage battery, and each supply a constant DC current from the DC bus to the first storage battery and from the first storage battery to the DC bus; and
   a controller,
   wherein the controller compares the generated power of the power generator with a load power supplied to the load appliance from the second converter,
   the controller is operable, when the generated power exceeds the load power, to cause the first bidirectional converters to charge the first storage batteries by each supplying the constant DC current to the corresponding first storage battery with a common charging rate, which is based on a power difference between the generated power and the load power and the DC voltage of the DC bus, and
   the controller is operable, when the generated power is below the load power, to cause the first bidirectional converters to discharge the first storage batteries by each supplying the constant DC current from the corresponding first storage battery to the DC bus with a common discharging rate, which is based on the power difference and the DC voltage of the DC bus,
   the DC power supplying system being characterized in that the controller executes a capacity calculation process that calculates present fully charged capacities of the plurality of first storage batteries, is operable, when the first storage batteries are charged, to calculate the constant DC currents that the first bidirectional converters are to supply to the corresponding first storage batteries based on the calculated present fully charged capacities and the common charging rate, and is operable, when the first storage batteries are discharged, to calculate the constant DC currents that the first bidirectional converters are to supply from the corresponding first storage batteries to the DC bus based on the calculated present fully charged capacities and the common discharging rate.

2. The DC power supplying system according to claim 1, wherein the controller executes a cycle measurement process that measures a present number of cycles for the plurality of first storage batteries and calculates, in the capacity calculation process, the present fully charged capacity based on the measured present number of cycles.

3. The DC power supplying system according to claim 1, further comprising:
a second storage battery; and
a constant voltage-type second bidirectional converter that is connected between the second storage battery and the DC bus, bidirectionally performs voltage conversion between the DC voltage supplied to the DC bus and a DC voltage of the second storage battery, is operable, when the DC voltage supplied to the DC bus falls below a voltage set in advance, to supply from the second storage battery to the DC bus, and is operable, when the DC voltage supplied to the DC bus is above a voltage set in advance, to supply from the DC bus to the second storage battery.

4. The DC power supplying system according to claim 1, further comprising:
a capacitor that is connected to the DC bus and is charged by the DC voltage of the DC bus.

5. The DC power supplying system according to claim 2, further comprising:
a second storage battery; and
a constant voltage-type second bidirectional converter that is connected between the second storage battery and the DC bus, bidirectionally performs voltage conversion between the DC voltage supplied to the DC bus and a DC voltage of the second storage battery, is operable, when the DC voltage supplied to the DC bus falls below a voltage set in advance, to supply from the second storage battery to the DC bus, and is operable, when the DC voltage supplied to the DC bus is above a voltage set in advance, to supply from the DC bus to the second storage battery.

6. The DC power supplying system according to claim 2, further comprising:
a capacitor that is connected to the DC bus and is charged by the DC voltage of the DC bus.

* * * * *